US012763674B2

(12) United States Patent
Ademane et al.

(10) Patent No.: US 12,763,674 B2
(45) Date of Patent: Oct. 13, 2026

(54) SYSTEMS, APPARATUSES, AND METHODS TO CONTROL A BRIDGELESS TOTEM POLE POWER FACTOR CORRECTION (PFC) CIRCUIT

(71) Applicant: STMicroelectronics International N.V., Geneva (CH)

(72) Inventors: Harsha Ademane, Chicago, IL (US); Rosario Attanasio, Barrington, IL (US)

(73) Assignee: STMicroelectronics International N.V., Geneva (CH)

( * ) Notice: Subject to any disclaimer, the term of this patent is extended or adjusted under 35 U.S.C. 154(b) by 184 days.

(21) Appl. No.: 18/753,705

(22) Filed: Jun. 25, 2024

(65) Prior Publication Data

US 2025/0392208 A1 Dec. 25, 2025

(51) Int. Cl.
*H02M 1/08* (2006.01)
*H02M 1/00* (2006.01)
*H02M 1/42* (2007.01)

(52) U.S. Cl.
CPC ....... *H02M 1/4233* (2013.01); *H02M 1/0012* (2021.05); *H02M 1/0009* (2021.05); *H02M 1/08* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/4225; H02M 1/42; H02M 1/4208; H02M 1/14; H02M 1/0009; H02M 1/007; H02M 1/32; H02M 1/385; H02M 1/38; H02M 1/4216; H02M 1/36; H02M 1/08; H02M 1/4258
See application file for complete search history.

(56) References Cited

U.S. PATENT DOCUMENTS

| | | | |
|---|---|---|---|
| 5,798,635 | A | 8/1998 | Hwang et al. |
| 8,248,041 | B2 | 8/2012 | Rausch et al. |
| 9,431,893 | B1 | 8/2016 | Xiong et al. |
| 9,608,513 | B2 | 3/2017 | Reddy |

(Continued)

FOREIGN PATENT DOCUMENTS

| | | | |
|---|---|---|---|
| EP | 3247029 | A1 | 11/2017 |

*Primary Examiner* — Bryan R Perez
(74) *Attorney, Agent, or Firm* — ALSTON & BIRD LLP

(57) ABSTRACT

Apparatuses, systems, and methods to control a bridgeless totem pole power factor correction (PFC) circuit are provided. An exemplary method includes providing a PFC circuit comprising switches and providing a PFC controller coupled to the PFC circuit. The PFC controller comprises a voltage rectification circuitry coupled to a voltage sense circuitry, a current rectification circuitry coupled to a current sense circuitry, an analog control circuitry coupled to the voltage rectification circuitry and the current rectification circuitry, and a driving logic circuitry coupled to the analog control circuitry. The analog control circuitry is configured output a pulse-width modulation (PWM) signal based on a voltage sense signal from the voltage rectification circuitry and a current sense signal from the current rectification circuitry. The driving logic circuitry is configured to generate signals based on the PWM signal. The method includes operating a switch of the switches to change states based on the signals.

20 Claims, 18 Drawing Sheets

(56) References Cited

U.S. PATENT DOCUMENTS

| | | | |
|---|---|---|---|
| 9,800,140 B2 | 10/2017 | Wen et al. | |
| 10,178,718 B2 | 1/2019 | Swaminathan et al. | |
| 12,395,063 B1 * | 8/2025 | Bing .................. | H02M 1/0009 |
| 2013/0249504 A1 | 9/2013 | Hsu | |
| 2018/0287488 A1 | 10/2018 | Chan | |
| 2020/0112243 A1 | 4/2020 | Dusmez | |

* cited by examiner

1100

SYSTEMS, APPARATUSES, AND METHODS TO CONTROL A BRIDGELESS TOTEM POLE POWER FACTOR CORRECTION (PFC) CIRCUIT

TECHNOLOGICAL FIELD

Example embodiments of the present disclosure relate generally to systems, apparatuses, and methods to control a bridgeless totem pole power factor correction (PFC) circuit.

BACKGROUND

Bridgeless totem pole PFC circuits include a fast leg with two switches driven at a higher switching frequency and a slow leg with two switches driven at a lower frequency. Conventional systems use digital controls, such as with a micro-controller, for controlling such switches. However digital controls necessitate software development, programming tools, and firmware-based end of line testing, which may be expensive and time consuming for developers.

New PFC controllers are needed. The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to systems, apparatuses, and methods to control a bridgeless totem pole power factor correction (PFC) circuit.

In accordance with some embodiments of the present disclosure, an example apparatus is provided. The example apparatus comprises:

a voltage sense circuitry configured to receive at least one voltage signal and output a first voltage sense signal representative of a line voltage of a power factor correction (PFC) circuit, wherein the first voltage sense signal comprises a first bi-directional waveform;

a voltage rectification circuitry coupled to the voltage sense circuitry, wherein the voltage rectification circuitry is configured to receive the first voltage sense signal and output a second voltage sense signal comprising a first uni-directional waveform;

a current sense circuitry configured to receive a current signal and output a first current sense signal representative of a current associated with an inductor of the PFC circuit, wherein the first current sense signal comprises a second bi-directional waveform;

a current rectification circuitry coupled to the current sense circuitry, wherein the current rectification circuitry is configured to receive the first current sense signal and output a second current sense signal comprising a second uni-directional waveform;

an analog control circuitry coupled to the voltage rectification circuitry and the current rectification circuitry, wherein the analog control circuitry is configured to receive the second voltage sense signal and the second current sense signal and output a pulse-width modulation (PWM) signal; and a driving logic circuitry coupled to the analog control circuitry, wherein the driving logic circuitry is configured to receive the PWM signal and generate a plurality of signals for a plurality of switches of the PFC circuit based at least in part on the PWM signal.

In some embodiments, the voltage sense circuitry comprises a difference amplifier, and wherein the voltage rectification circuitry comprises a full-wave signal rectifier coupled to the difference amplifier.

In some embodiments, the current sense circuitry comprises a shunt resistor, and wherein the current rectification circuitry comprises a high-frequency full-wave rectification circuit.

In some embodiments, the current sense circuitry and the current rectification circuitry are substantially isolated from the plurality of switches.

In some embodiments, the apparatus comprises a current sensing device including the current sense circuitry and the current rectification circuitry, and wherein the current rectification circuitry comprises a high-frequency full-wave rectification circuitry of the current sensing device.

In some embodiments, the analog control circuitry comprises a voltage loop configured to regulate an output voltage associated with the PFC circuit and a current loop configured to regulate the current, and wherein the analog control circuitry is configured to generate the PWM signal based at least in part on the voltage loop and the current loop.

In some embodiments, the analog control circuitry comprises a PWM stop logic circuitry configured to disable one or more switches of the plurality of switches of the PFC circuit in response to one or more triggers.

In some embodiments, the one or more triggers comprise at least one of the following: a burst mode, a disable command, over voltage protection, an idle mode, feedback disconnection, over current protection, or zero current detection.

In some embodiments, each signal of the plurality of signals generated via the driving logic circuitry is associated with a respective switch of the plurality of switches of the PFC circuit.

In some embodiments, the plurality of signals generated via the driving logic circuitry comprises a fast leg low side signal, a fast leg high side signal, a slow leg low side signal, and a slow leg high side signal.

In some embodiments, respective values of the slow leg low side signal and the slow leg high side signal are based at least in part on a half cycle associated with the first voltage sense signal, and wherein the fast leg low side signal and the fast leg high side signal are based at least in part on the slow leg low side signal, the slow leg high side signal, and the PWM signal.

In some embodiments, the controller further comprises a plurality of gate drivers associated with the plurality of switches.

In some embodiments, the driving logic circuitry is configured to output the plurality of signals to a plurality of gate drivers associated with the plurality of switches, and wherein the plurality of gate drivers is external to the controller.

In some embodiments, the apparatus comprises a first portion of circuitry and a second portion of circuitry coupled to the first portion of circuitry, wherein the first portion of circuitry includes at least the analog control circuitry, and wherein the second portion of circuitry includes at least a portion of the driving logic circuitry.

In some embodiments, the second portion of circuitry further includes a plurality of gate drivers associated with the plurality of switches and the PFC circuit.

In accordance with some other embodiments of the present disclosure, an example system is provided. The example system comprises:

- a power factor correction (PFC) circuit comprising a plurality of switches; and
- a controller for the PFC circuit, wherein the controller comprises:
- a voltage sense circuitry configured to receive at least one voltage signal and output a first voltage sense signal representative of a line voltage of the PFC circuit, wherein the first voltage sense signal comprises a first bi-directional waveform;
- a voltage rectification circuitry coupled to the voltage sense circuitry, wherein the voltage rectification circuitry is configured to receive the first voltage sense signal and output a second voltage sense signal comprising a first uni-directional waveform;
- a current sense circuitry configured to receive a current signal and output a first current sense signal representative of a current associated with an inductor of the PFC circuit, wherein the first current sense signal comprises a second bi-directional waveform;
- a current rectification circuitry coupled to the current sense circuitry, wherein the current rectification circuitry is configured to receive the first current sense signal and output a second current sense signal comprising a second uni-directional waveform;
- an analog control circuitry coupled to the voltage rectification circuitry and the current rectification circuitry, wherein the analog control circuitry is configured to receive the second voltage sense signal and the second current sense signal and output a pulse-width modulation (PWM) signal; and
- a driving logic circuitry coupled to the analog control circuitry, wherein the driving logic circuitry is configured to receive the PWM signal and generate a plurality of signals for the plurality of switches based at least in part on the PWM signal.

In some embodiments, the plurality of switches comprises a plurality of gallium nitride transistors.

In some embodiments, the PFC circuit is configured in accordance with a bridgeless totem pole topology.

In accordance with some other embodiments of the present disclosure, an example method is provided. The example method comprises:

- providing a power factor correction (PFC) circuit comprising a plurality of switches;
- providing a PFC controller coupled to the PFC circuit,
- wherein the PFC controller comprises a voltage rectification circuitry coupled to a voltage sense circuitry, a current rectification circuitry coupled to a current sense circuitry, an analog control circuitry coupled to the voltage rectification circuitry and the current rectification circuitry, and a driving logic circuitry coupled to the analog control circuitry,
- wherein the analog control circuitry is configured output a pulse-width modulation (PWM) signal based at least in part on a voltage sense signal from the voltage rectification circuitry and a current sense signal from the current rectification circuitry, and
- wherein the driving logic circuitry is configured to generate a plurality of signals based at least in part on the PWM signal; and
- operating at least one switch of the plurality of switches to change states between an on state and an off state based at least in part on at least one signal of the plurality of signals.

In some embodiments, the analog control circuitry comprises a voltage loop configured to regulate an output voltage associated with the PFC circuit and a current loop configured to regulate a current associated with the PFC circuit, and wherein the analog control circuitry is configured to generate the PWM signal based at least in part on the voltage loop and the current loop.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those summarized here, some of which will be further described below.

BRIEF SUMMARY OF THE DRAWINGS

Figure 1A:
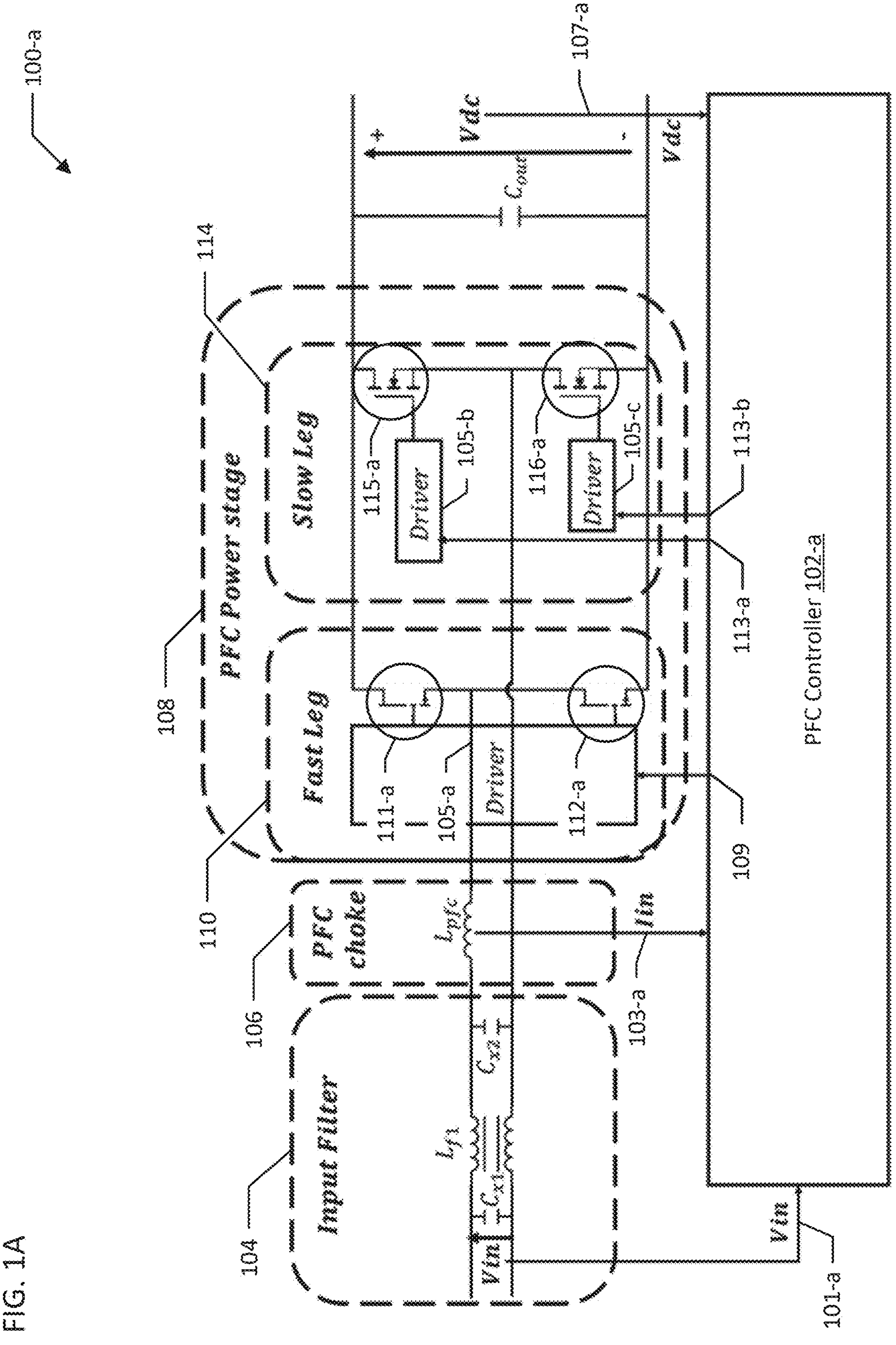
Figure 1B:
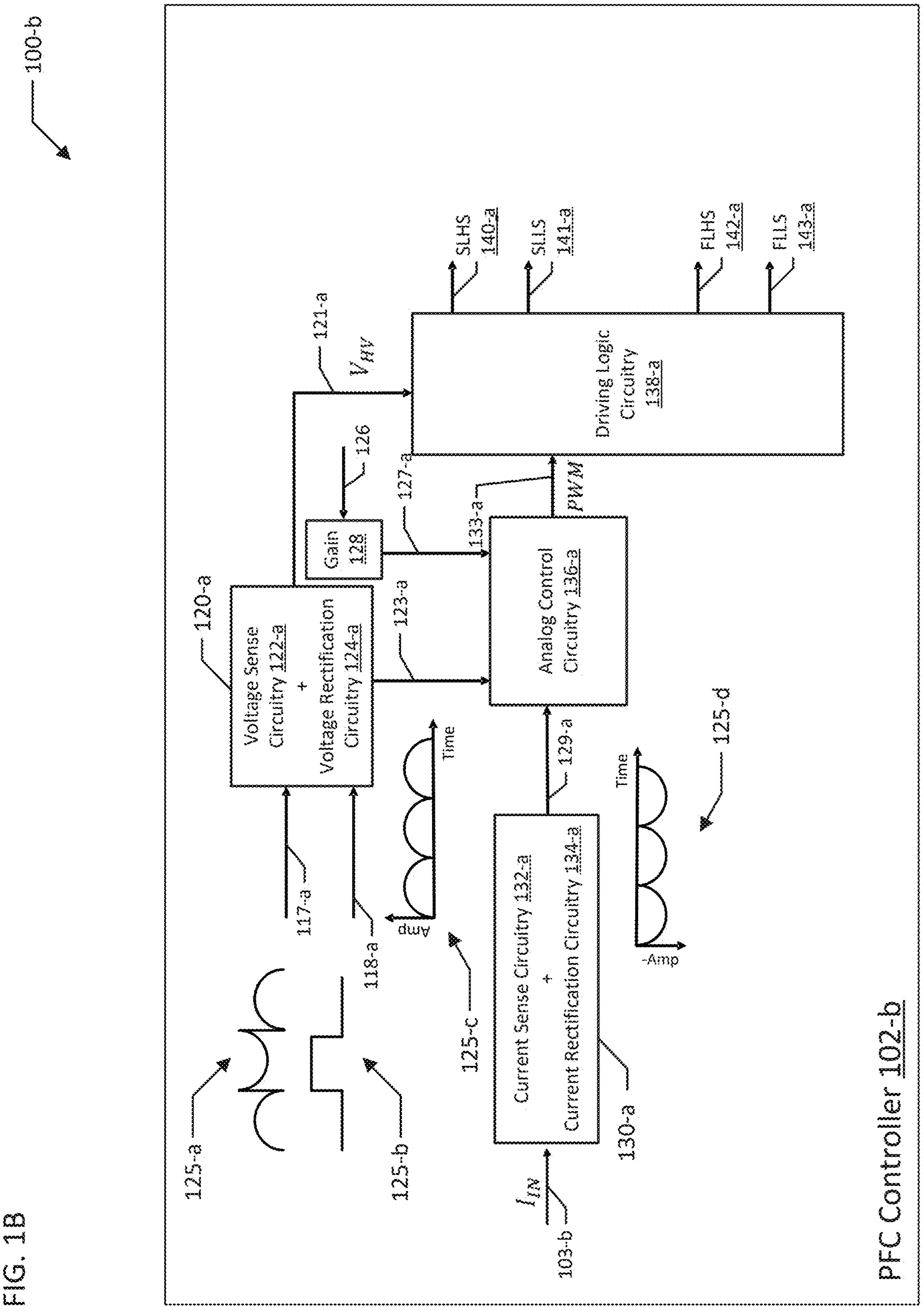
Figure 2A:
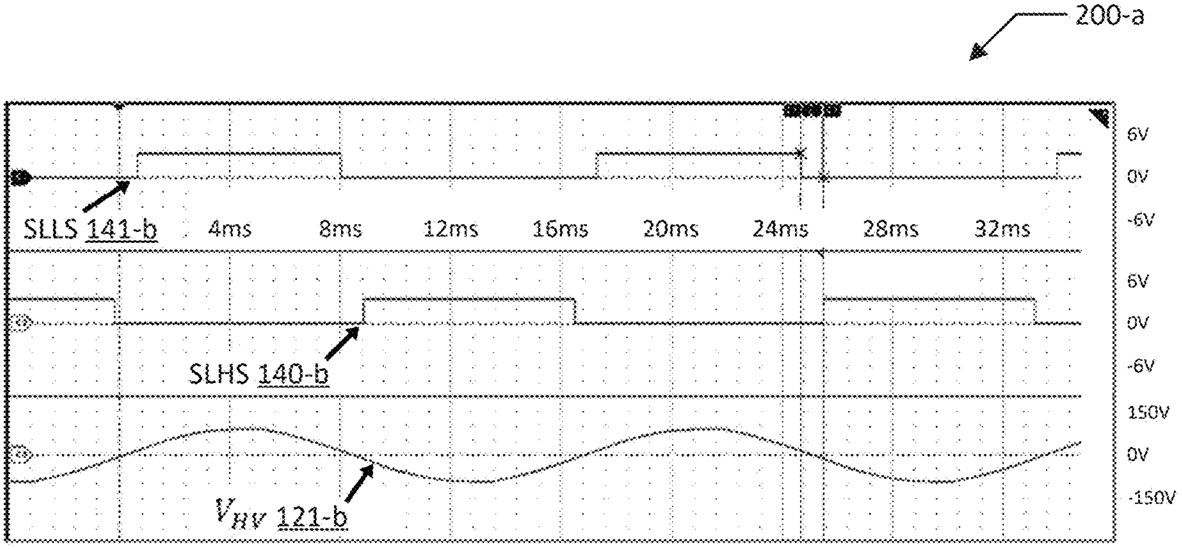
Figure 2B:
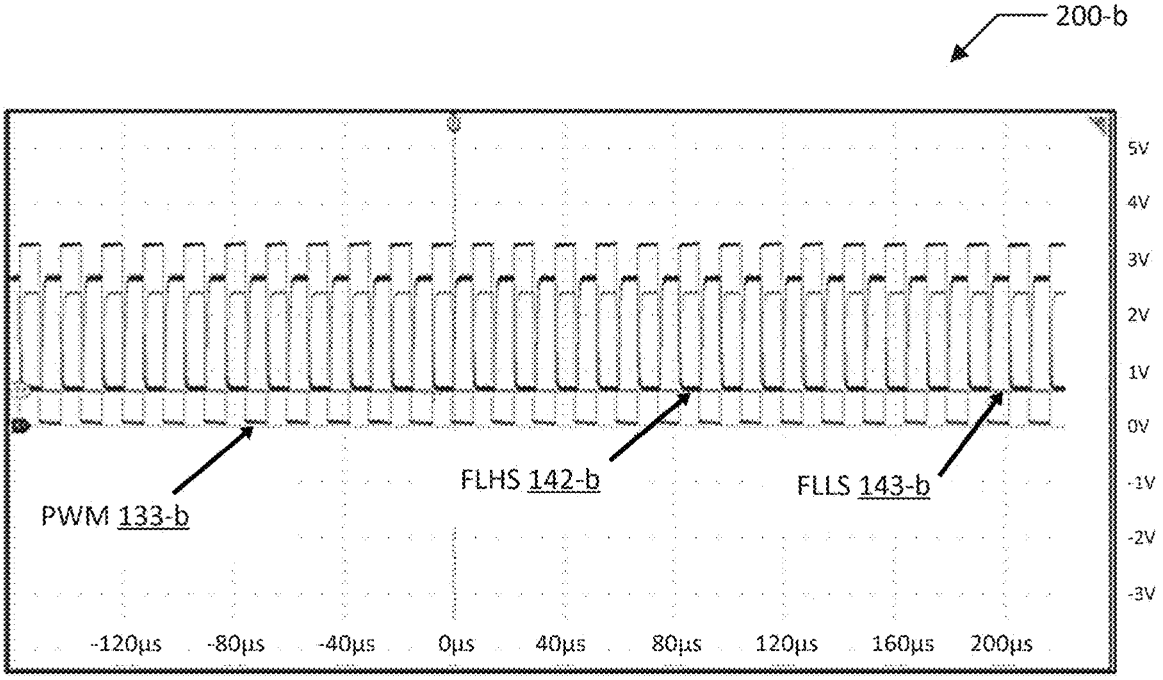
Figure 3A:
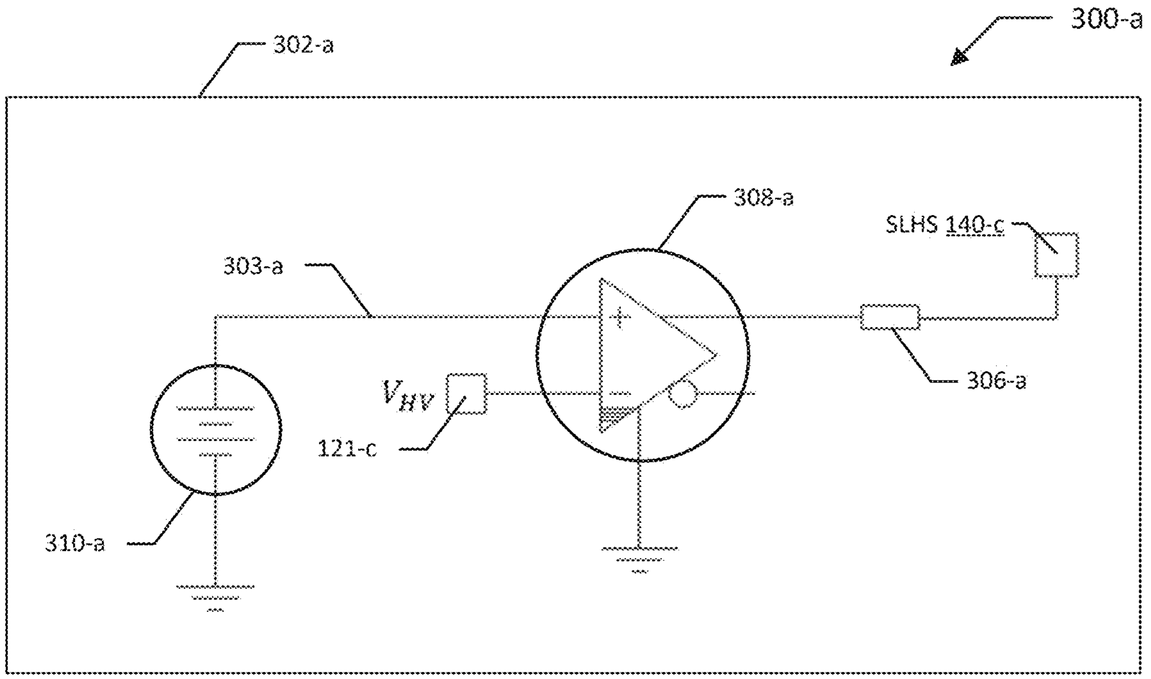
Figure 3B:
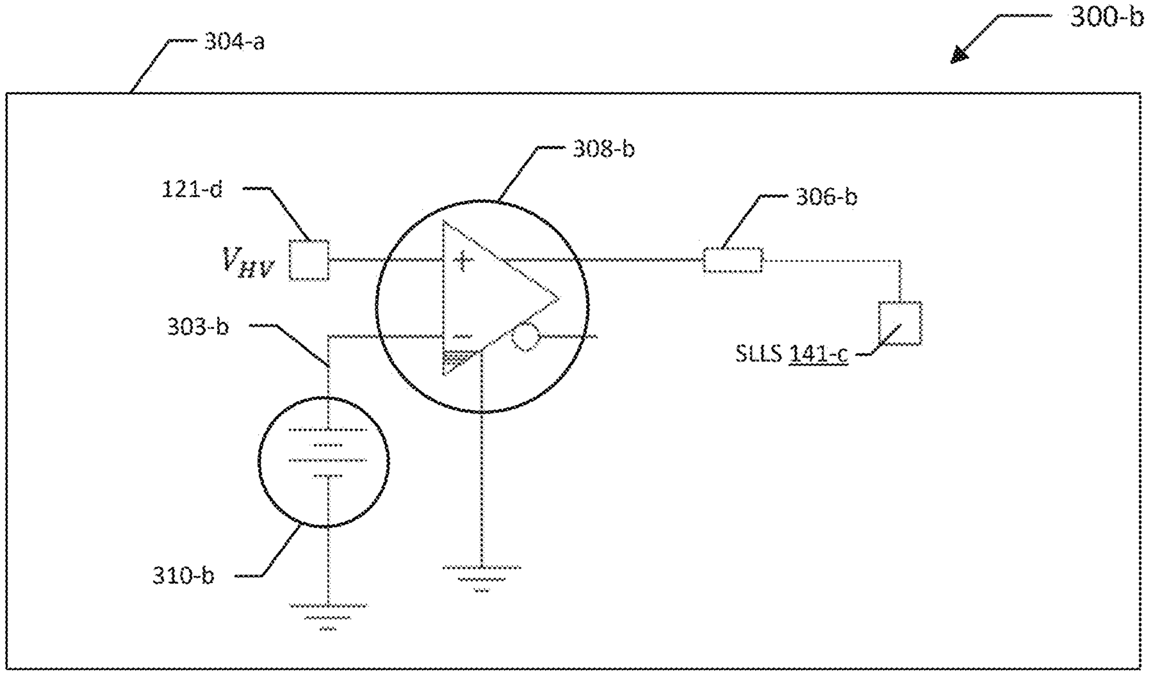
Figure 4:
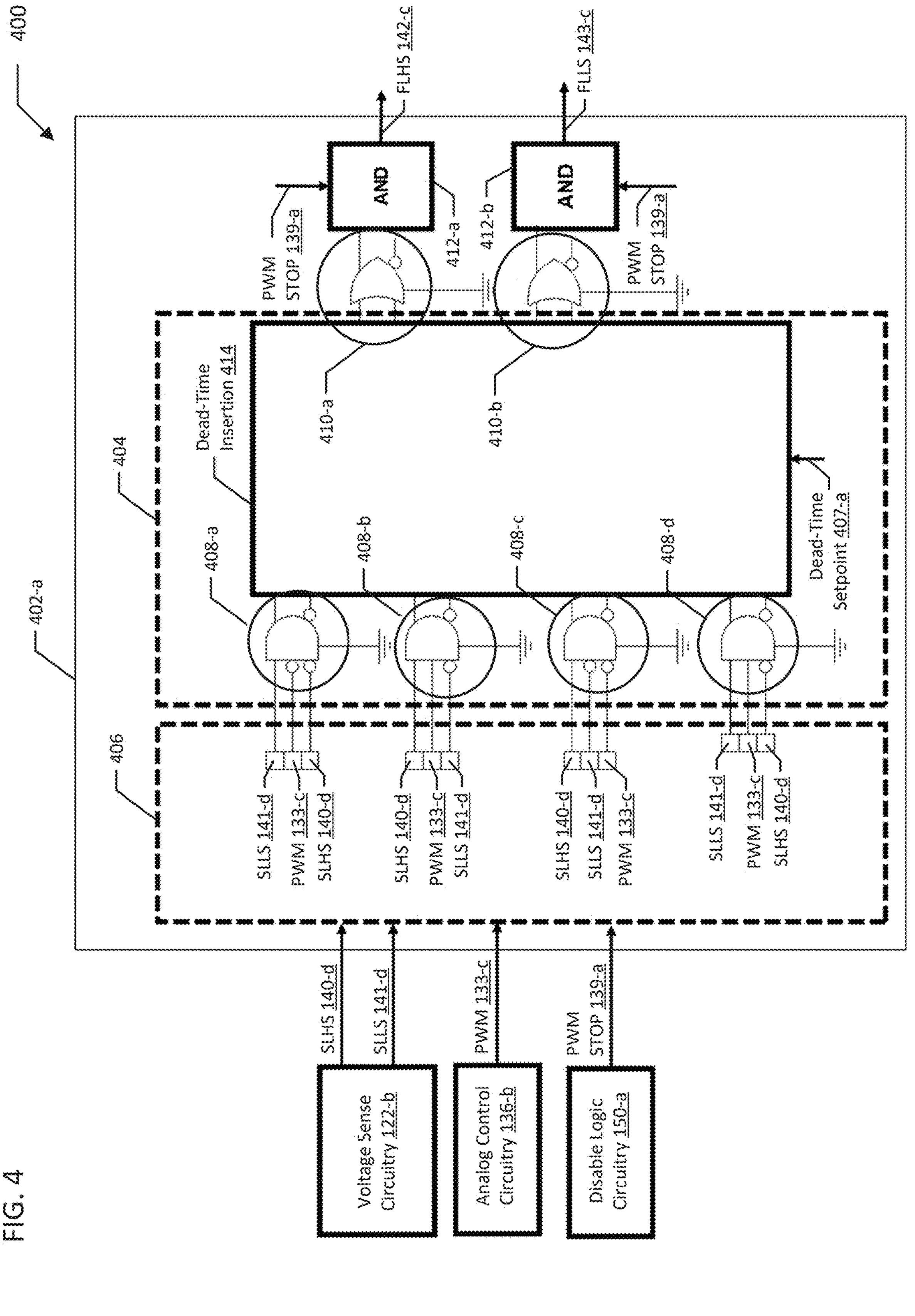
Figure 5:
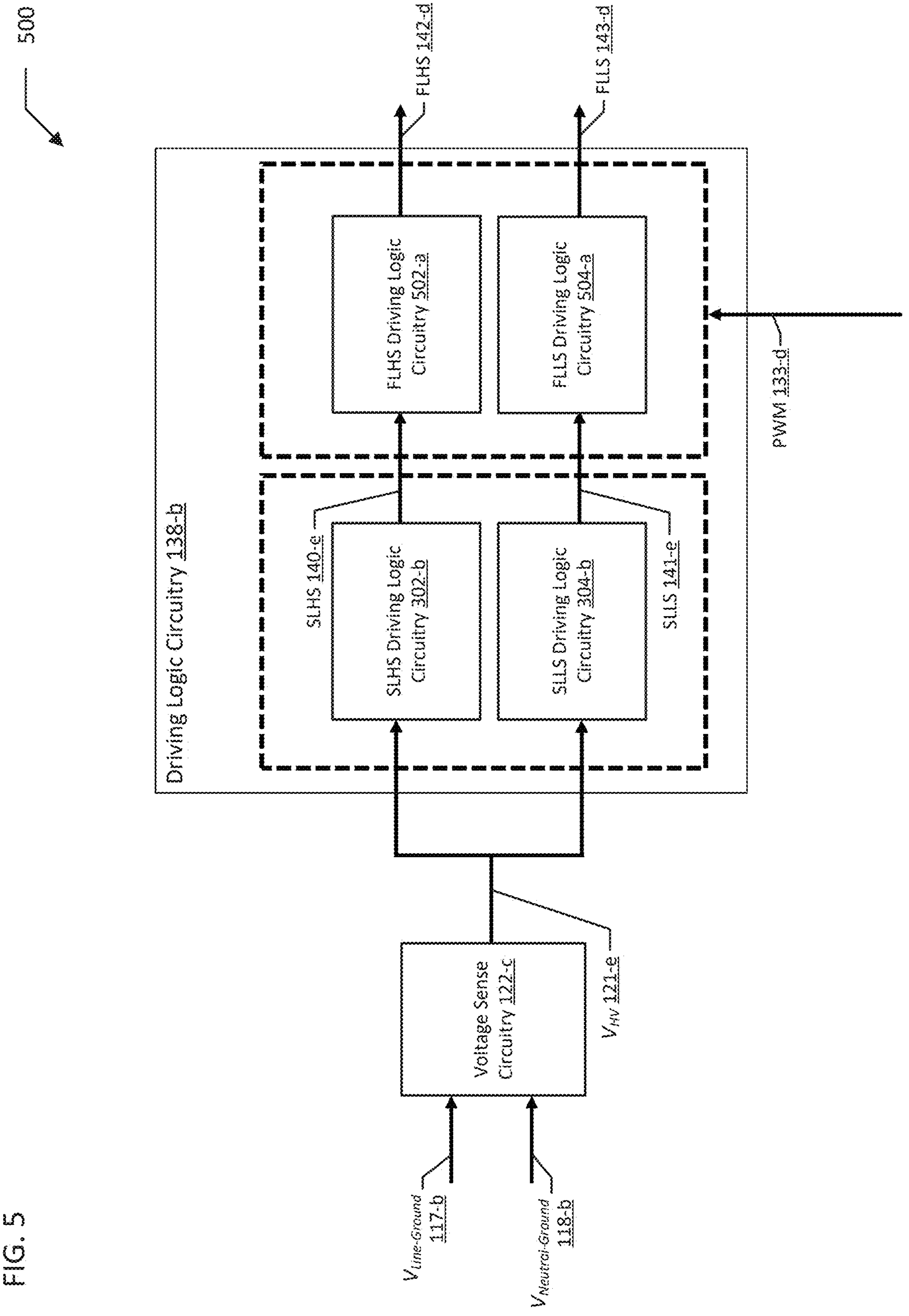
Figure 6:
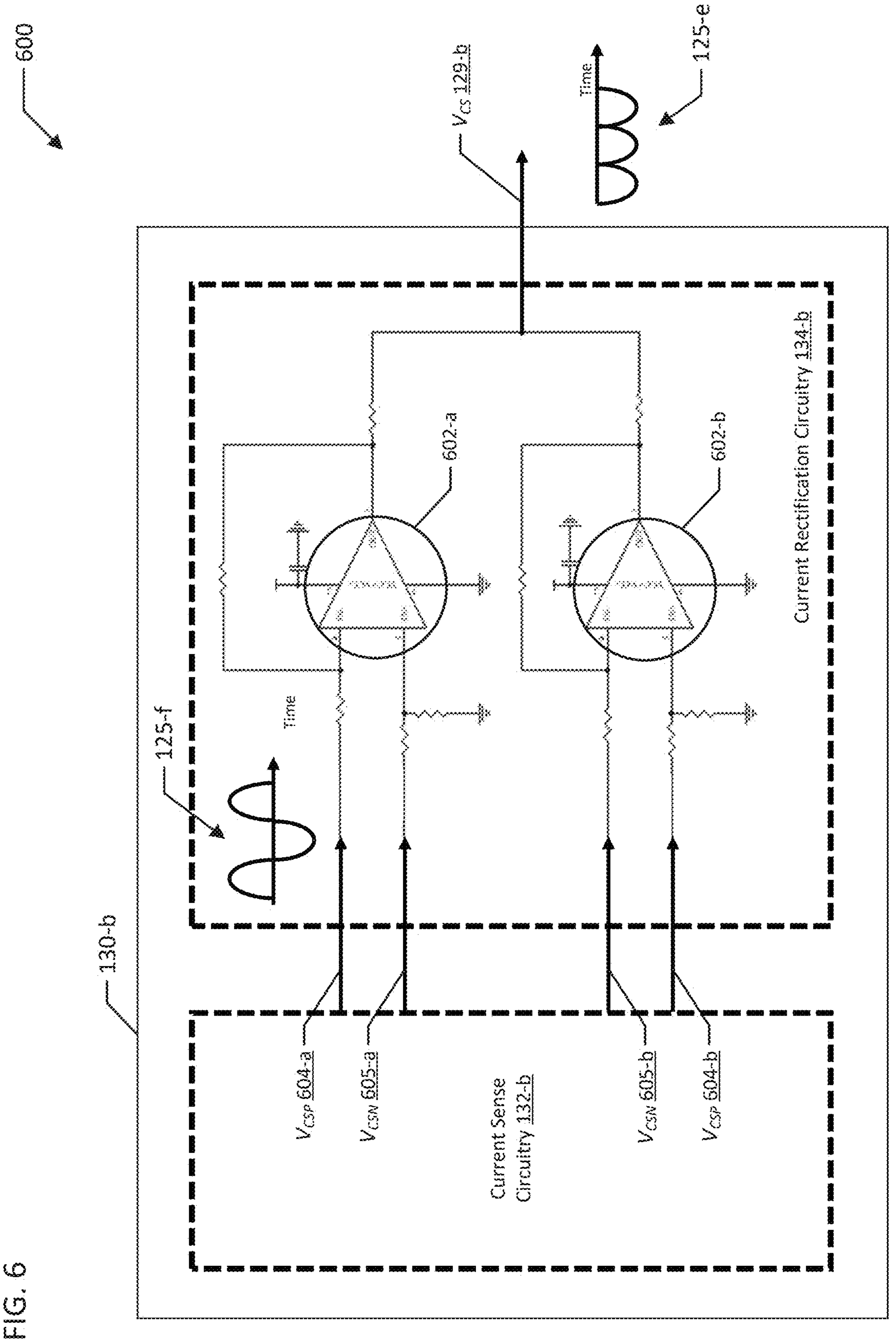
Figure 7:
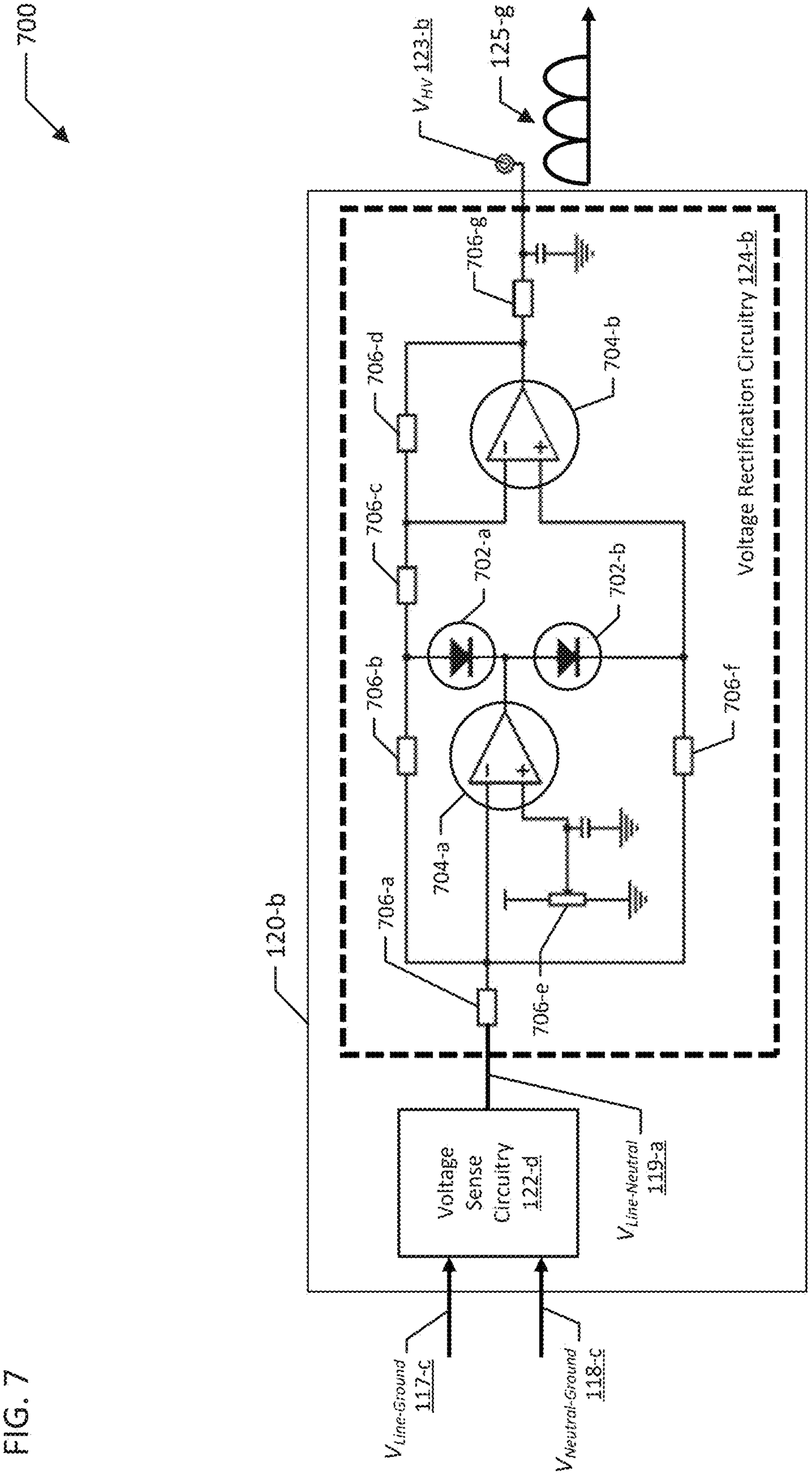
Figure 8:
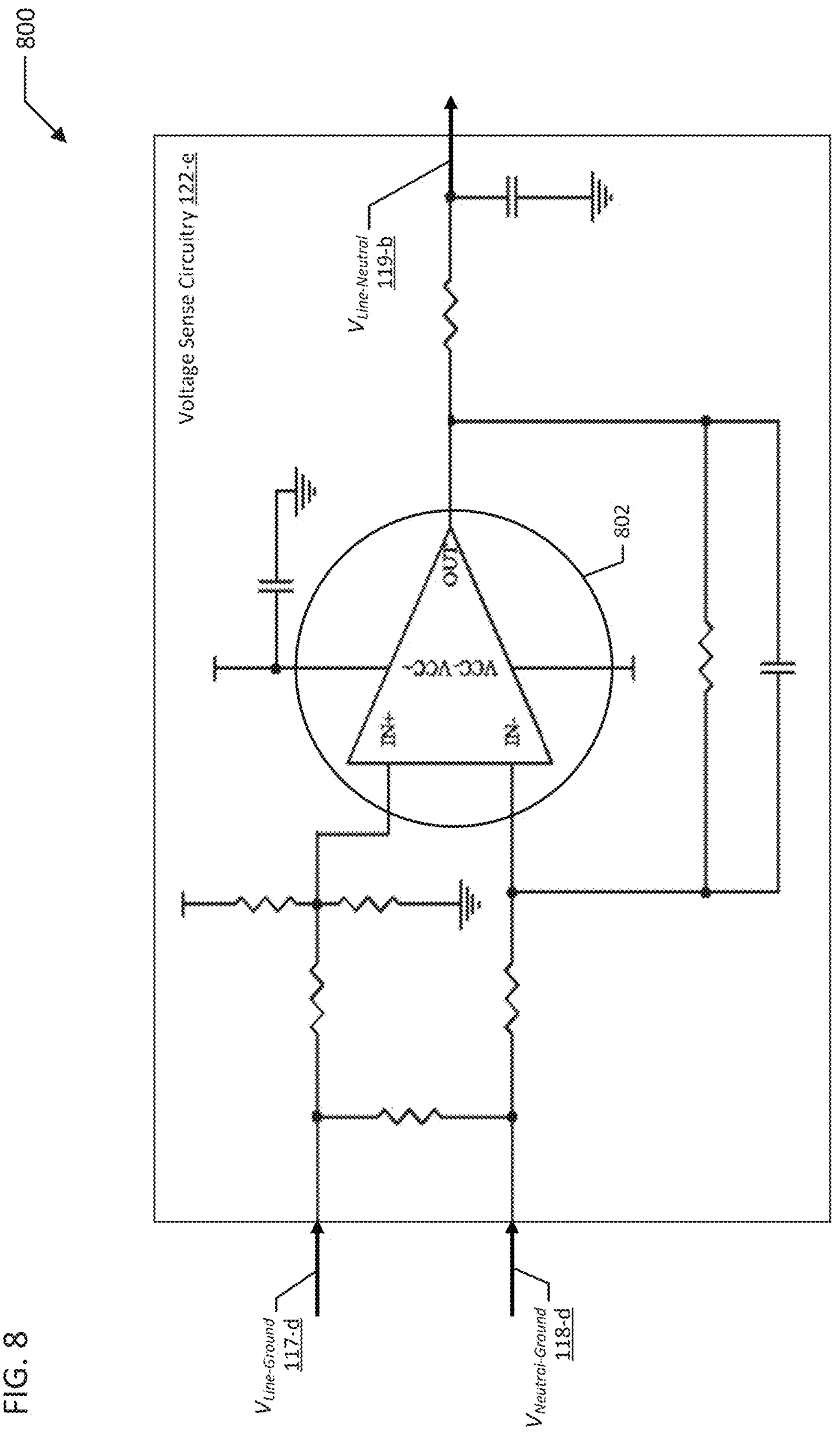
Figure 9:
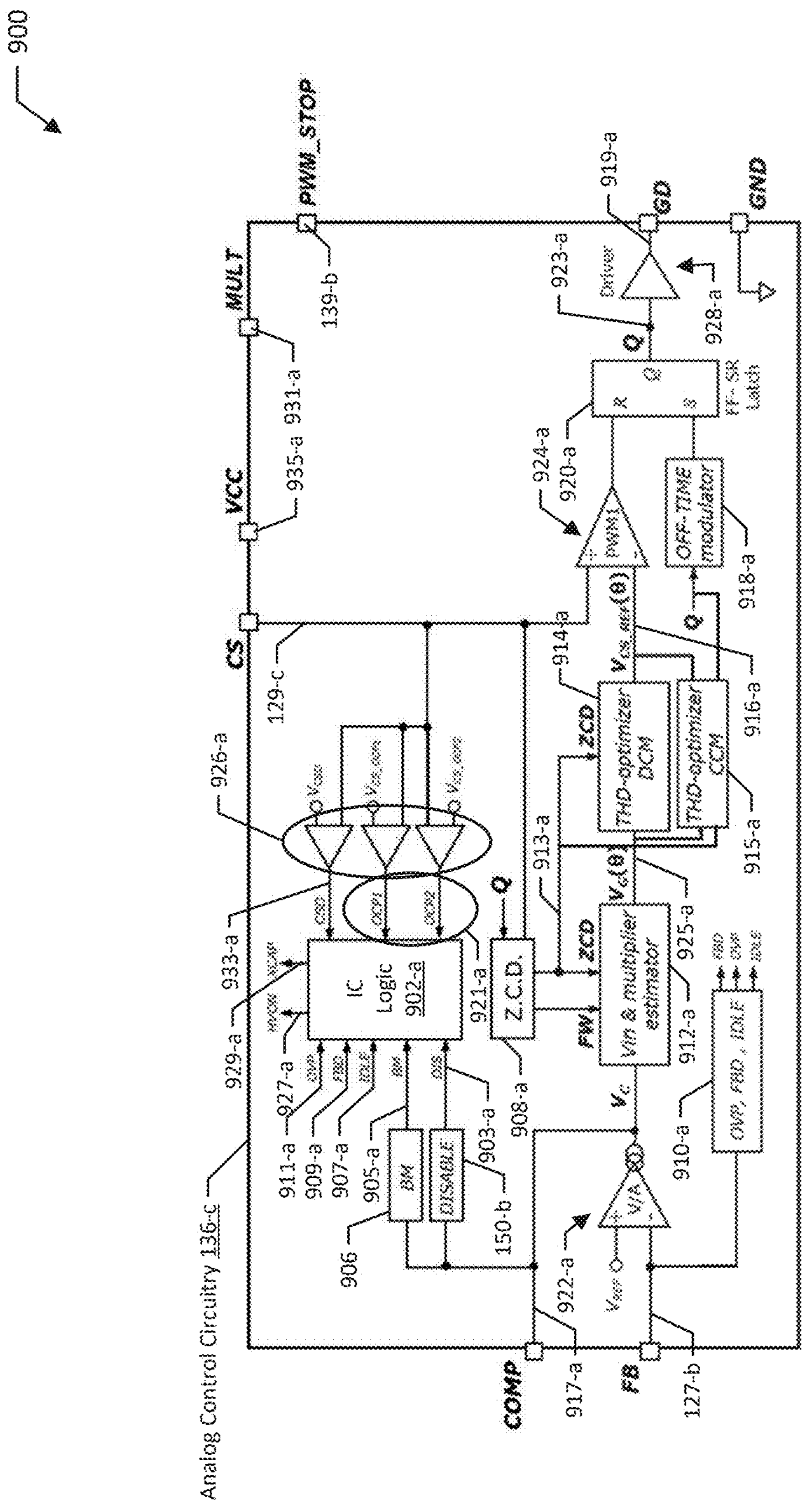
Figure 10:
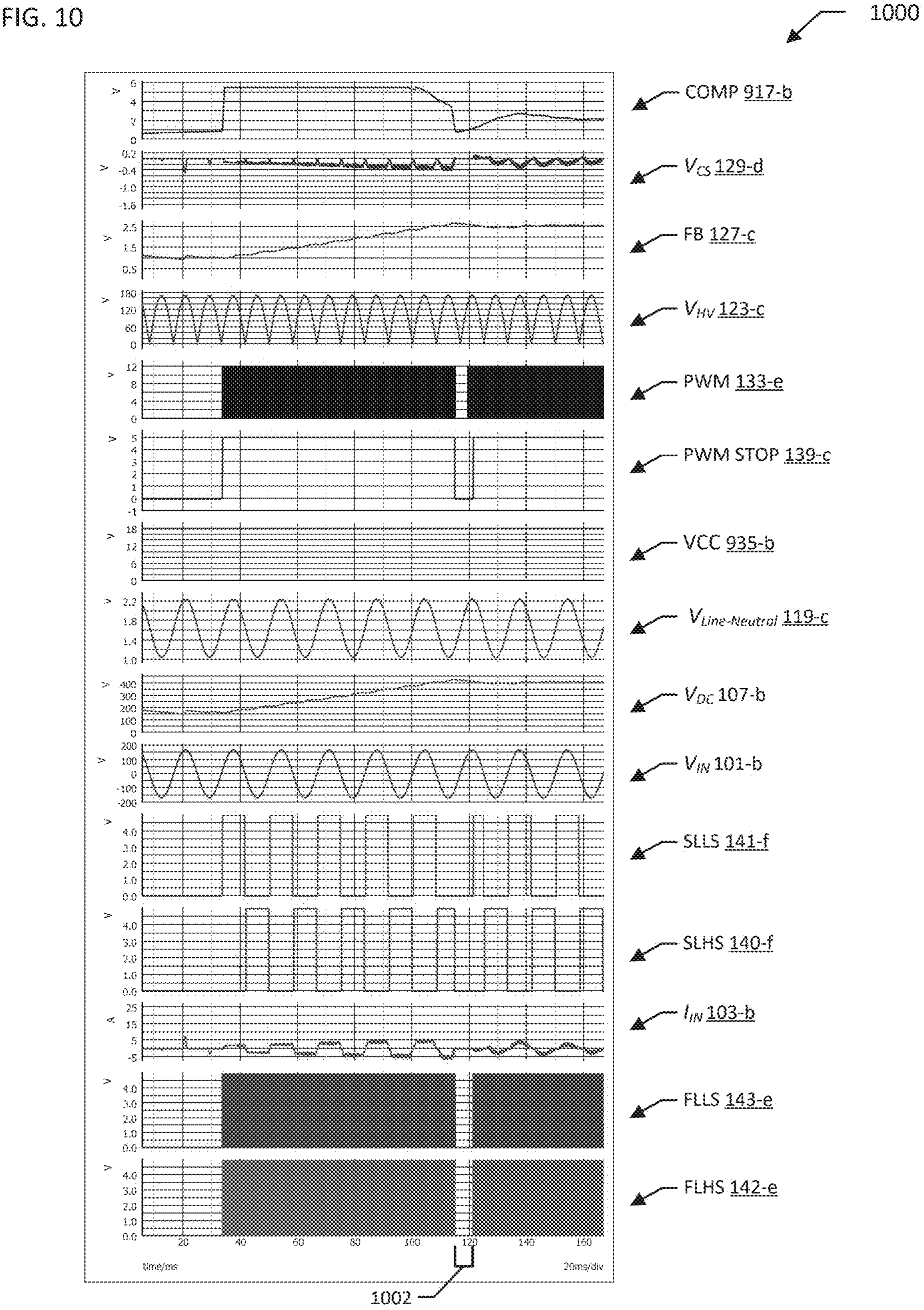
Figure 11:
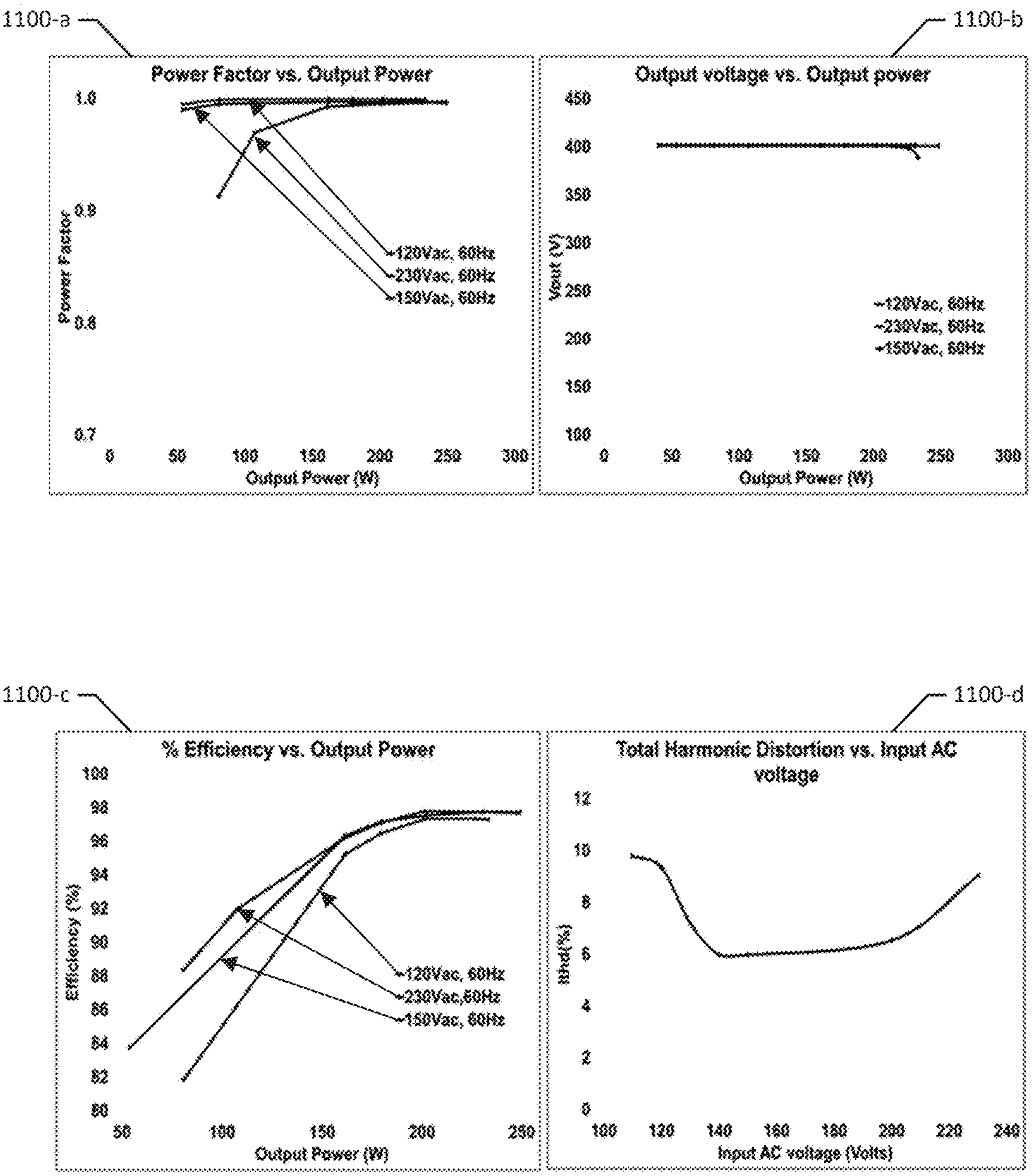
Figure 12:
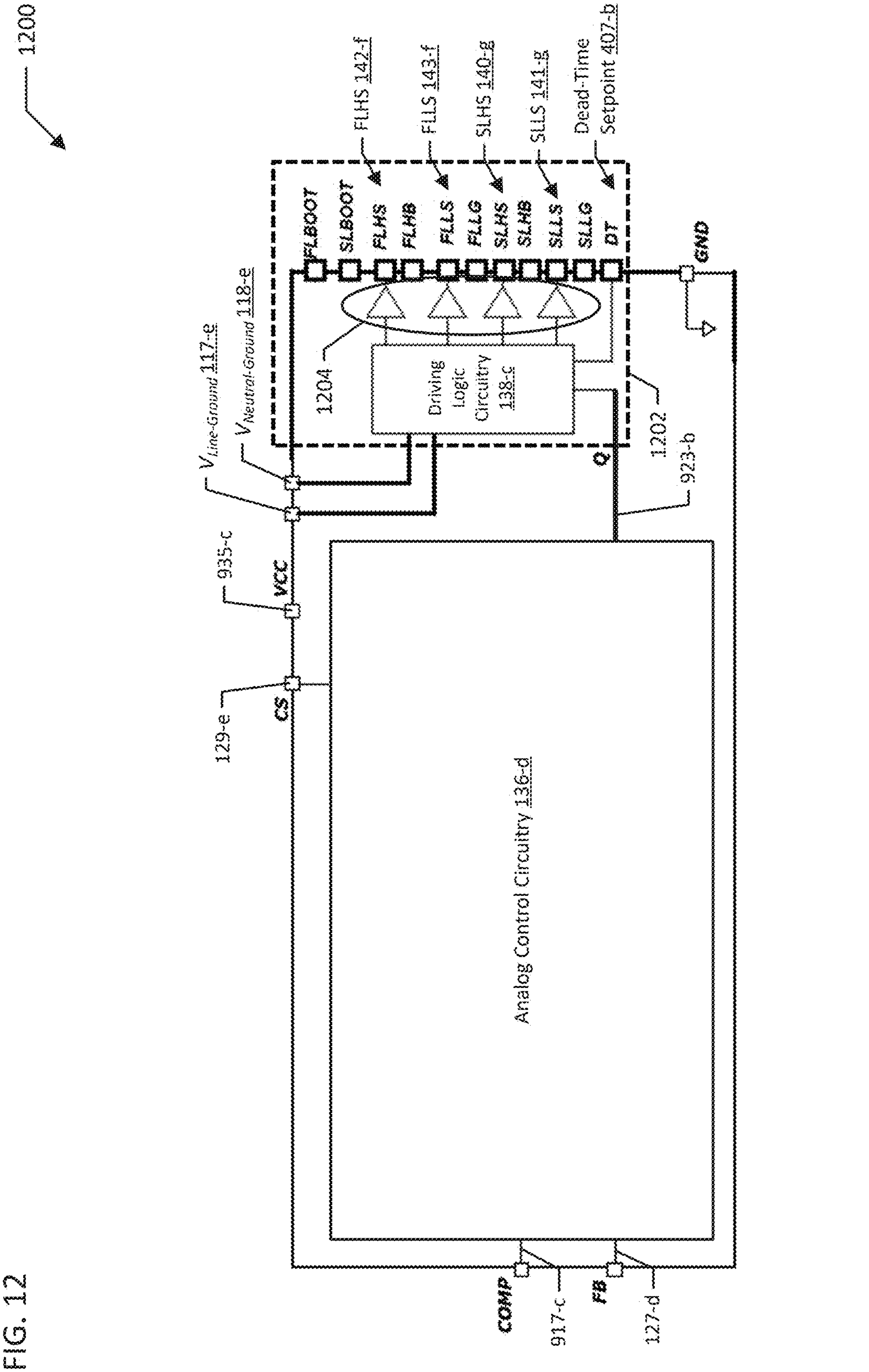
Figure 13:
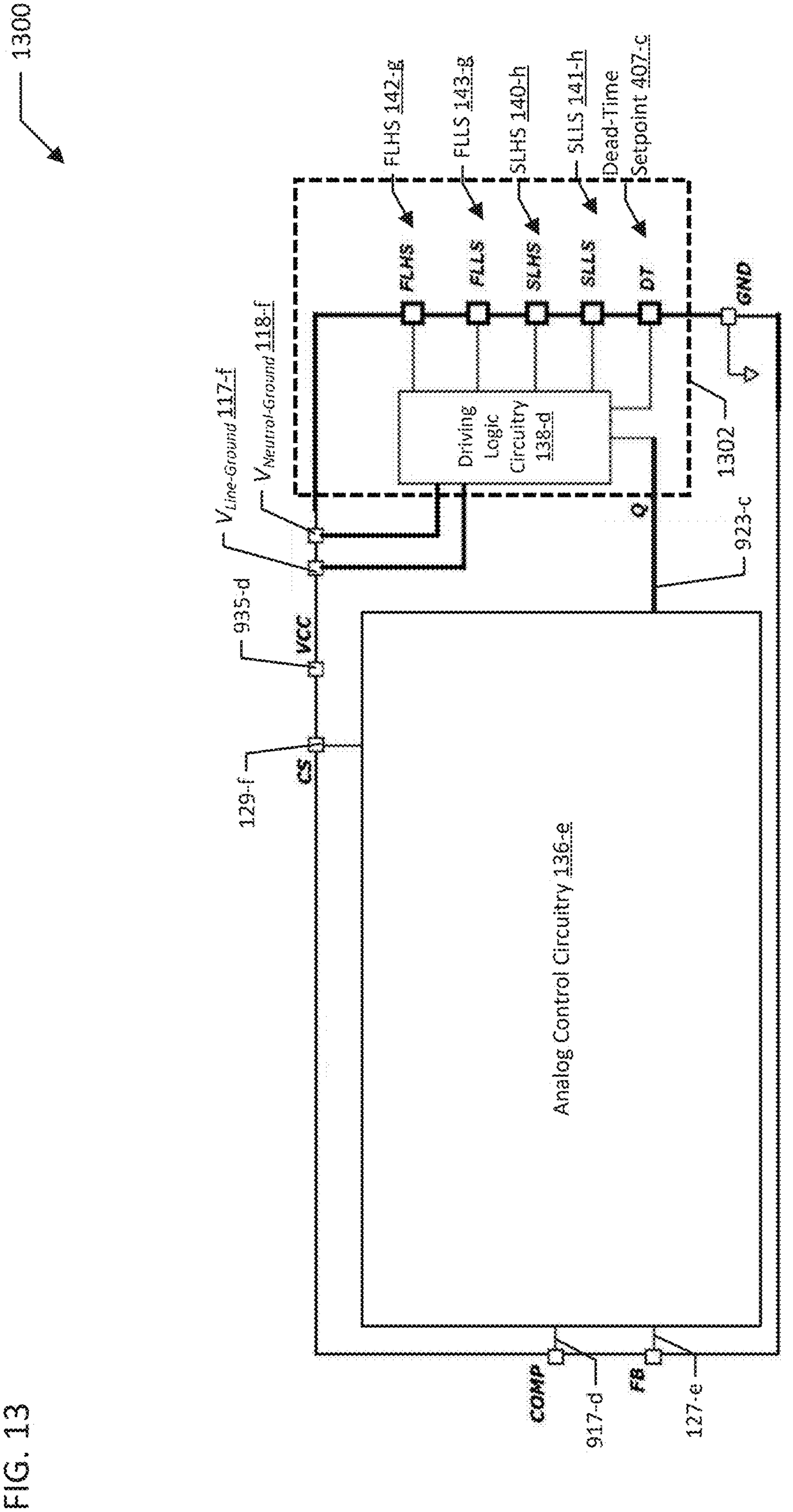
Figure 14:
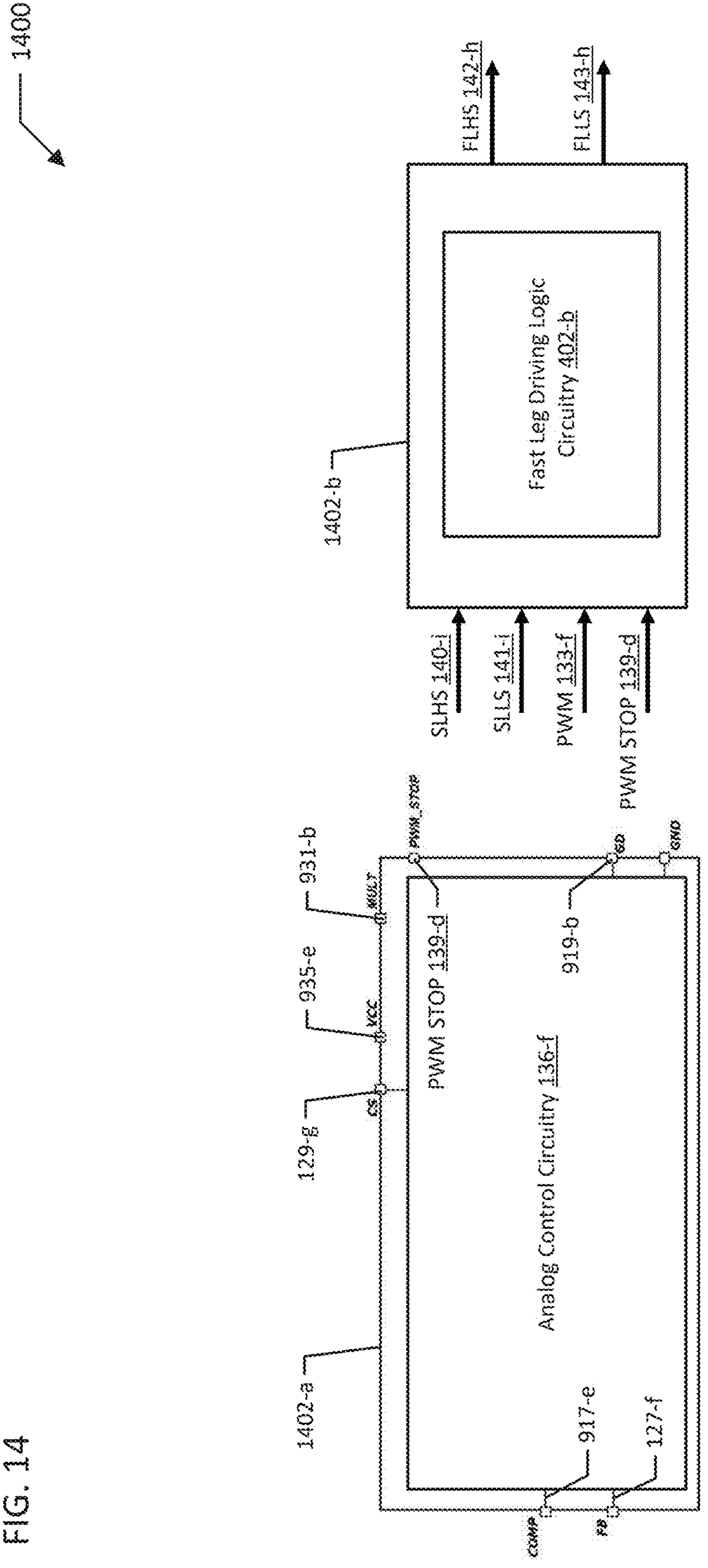
Figure 15:
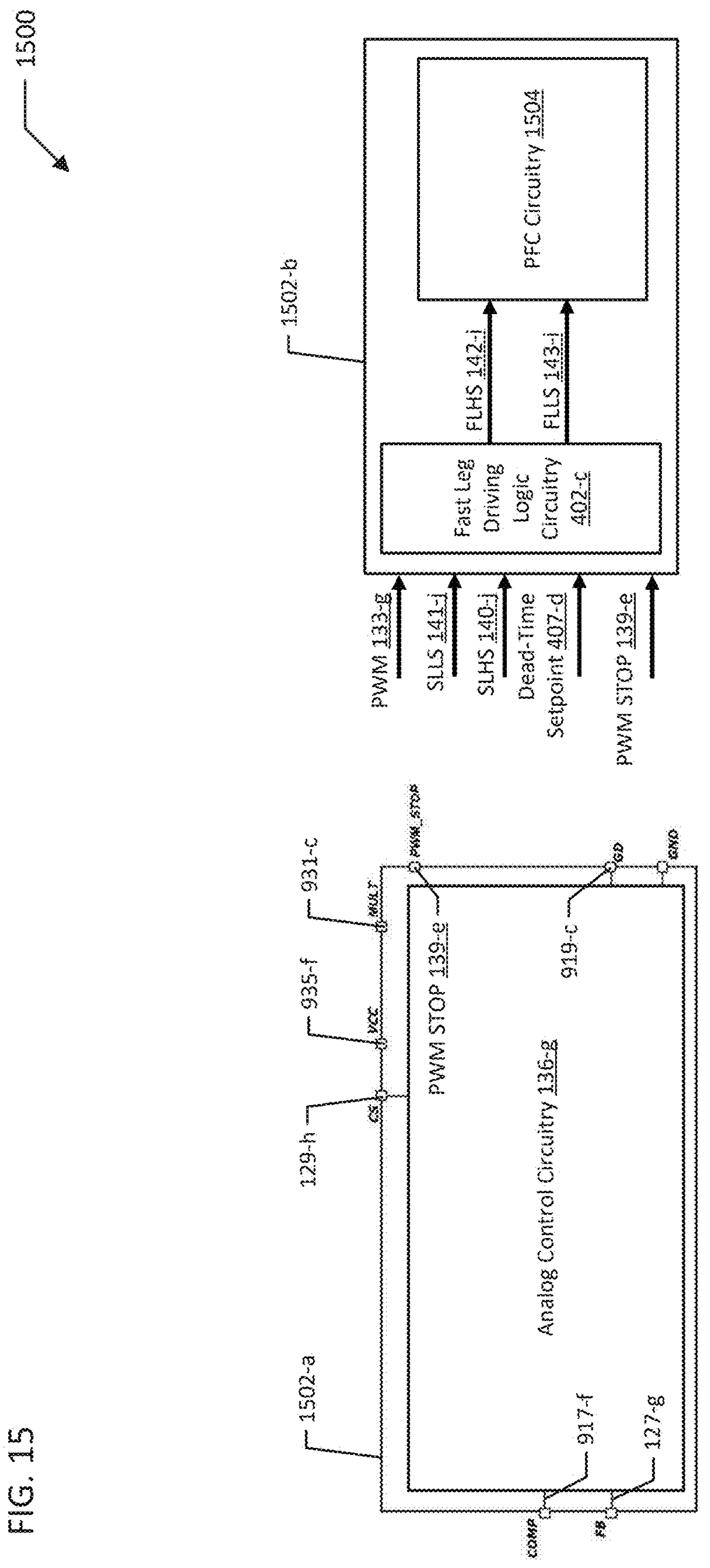
Figure 16:
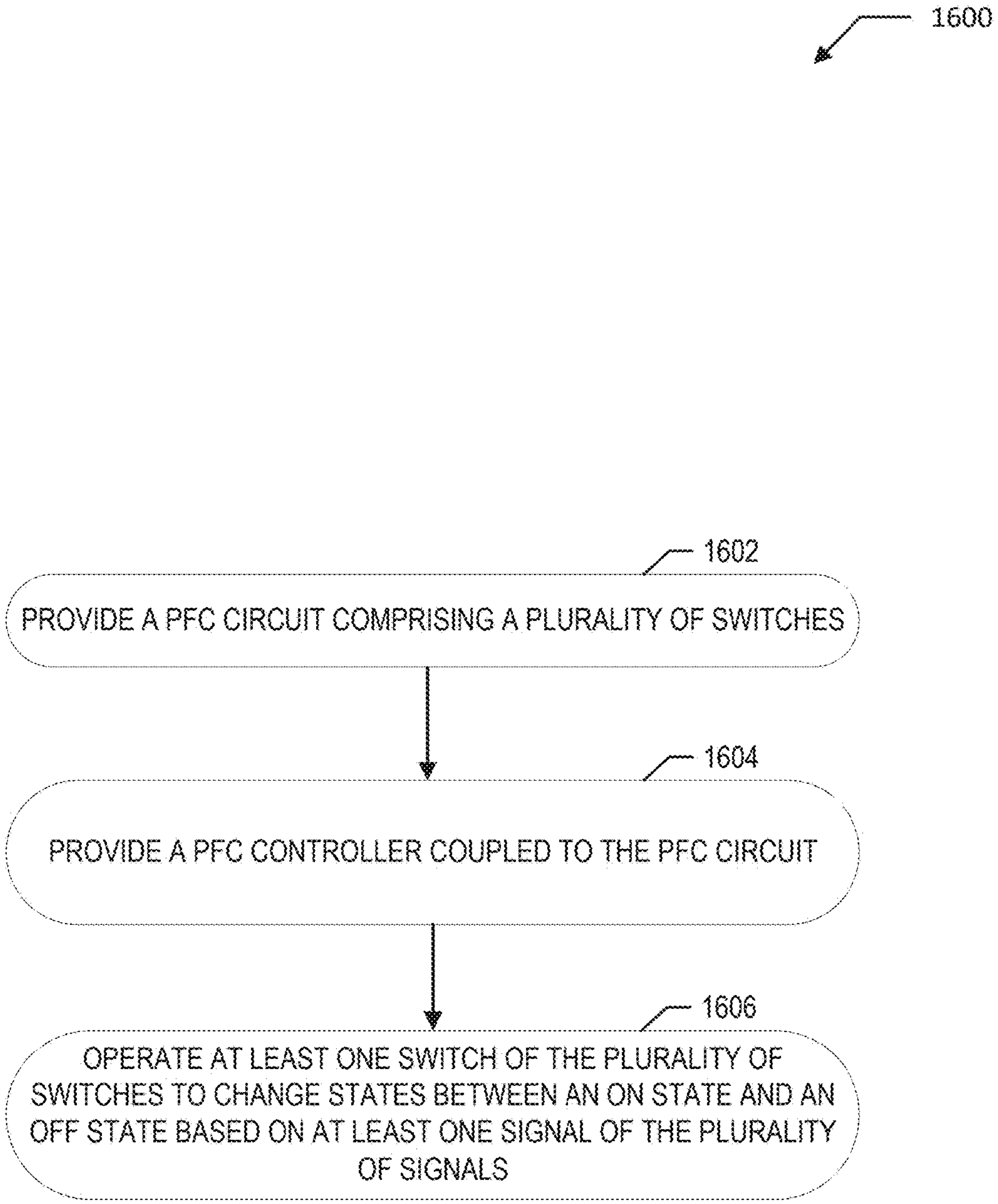
Figure 17:
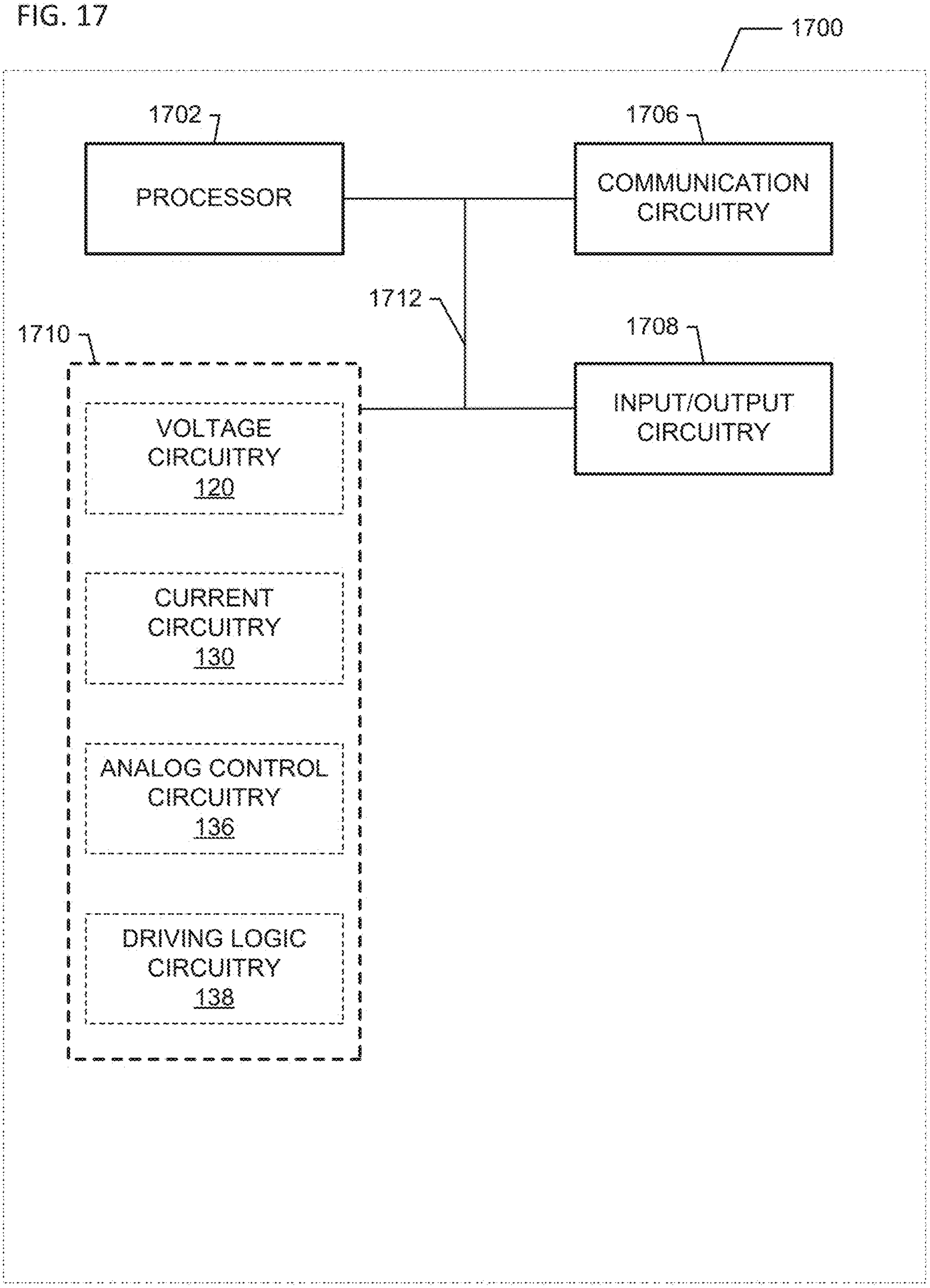

Having thus described certain example embodiments of the present disclosure in general terms, reference will now be made to the accompanying drawings, which are not necessarily drawn to scale, and wherein:

FIG. 1A illustrates an exemplary diagram of a system configured to support systems and methods to control a bridgeless totem pole PFC circuit in accordance with one or more embodiments of the present disclosure;

FIG. 1B illustrates an exemplary diagram of a PFC controller configured to support systems and methods to control a bridgeless totem pole PFC circuit in accordance with one or more embodiments of the present disclosure;

FIG. 2A illustrates an exemplary graph of slow leg driving signals configured to support systems and methods to control a bridgeless totem pole PFC circuit in accordance with one or more embodiments of the present disclosure;

FIG. 2B illustrates an exemplary graph of fast leg driving signals configured to support systems and methods to control a bridgeless totem pole PFC circuit in accordance with one or more embodiments of the present disclosure;

FIGS. 3A and 3B illustrate exemplary diagrams of slow leg driving logic circuitry configured to support systems and methods to control a bridgeless totem pole PFC circuit in accordance with one or more embodiments of the present disclosure;

FIG. 4 illustrates an exemplary diagram of a system configured to support systems and methods to control a bridgeless totem pole PFC circuit in accordance with one or more embodiments of the present disclosure;

FIG. 5 illustrates an exemplary diagram of driving logic circuitry configured to support systems and methods to control a bridgeless totem pole PFC circuit in accordance with one or more embodiments of the present disclosure;

FIG. 6 illustrates an exemplary diagram of current circuitry configured to support systems and methods to control a bridgeless totem pole PFC circuit in accordance with one or more embodiments of the present disclosure;

FIG. 7 illustrates an exemplary diagram of voltage circuitry configured to support systems and methods to control a bridgeless totem pole PFC circuit in accordance with one or more embodiments of the present disclosure;

FIG. 8 illustrates an exemplary diagram of voltage sense circuitry configured to support systems and methods to control a bridgeless totem pole PFC circuit in accordance with one or more embodiments of the present disclosure;

FIG. 9 illustrates an exemplary diagram of analog control circuitry configured to support systems and methods to control a bridgeless totem pole PFC circuit in accordance with one or more embodiments of the present disclosure;

FIG. 10 illustrates an exemplary graph of signals configured to support systems and methods to control a bridgeless totem pole PFC circuit in accordance with one or more embodiments of the present disclosure;

FIG. 11 illustrates exemplary graphs associated with a PFC controller configured to support systems and methods to control a bridgeless totem pole PFC circuit in accordance with one or more embodiments of the present disclosure;

FIG. 12 illustrates and exemplary diagram of a system configured to support systems and methods to control a bridgeless totem pole PFC circuit in accordance with one or more embodiments of the present disclosure;

FIG. 13 illustrates and exemplary diagram of a system configured to support systems and methods to control a bridgeless totem pole PFC circuit in accordance with one or more embodiments of the present disclosure;

FIG. 14 illustrates and exemplary diagram of a system configured to support systems and methods to control a bridgeless totem pole PFC circuit in accordance with one or more embodiments of the present disclosure;

FIG. 15 illustrates and exemplary diagram of a system configured to support systems and methods to control a bridgeless totem pole PFC circuit in accordance with one or more embodiments of the present disclosure;

FIG. 16 illustrates a flowchart of operations that support systems and methods to control a bridgeless totem pole PFC circuit in accordance with one or more embodiments of the present disclosure; and FIG. 17 illustrates an exemplary device that support systems and methods to control a bridgeless totem pole PFC circuit in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in various embodiments,” “in one embodiment,” “according to one embodiment,” “in some embodiments,” and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word “example” or “exemplary” is used herein to mean “serving as an example, instance, or illustration.” Any implementation described herein as “exemplary” is not necessarily to be construed as preferred or advantageous over other implementations.

If the specification states a component or feature “may,” “can,” “could,” “should,” “would,” “preferably,” “possibly,” “typically,” “optionally,” “for example,” “often,” or “might” (or other such language) be included or have a characteristic, that a specific component or feature is not required to be included or to have the characteristic. Such a component or feature may be optionally included in some embodiments or it may be excluded.

The use of the term “circuitry” as used herein with respect to components of a system or an apparatus should be understood to include particular hardware configured to perform the functions associated with the particular circuitry as described herein. The term “circuitry” should be understood broadly to include hardware and, in some embodiments, software for configuring the hardware. For example, in some embodiments, “circuitry” may include processing circuitry, communications circuitry, input/output circuitry, and the like. In some embodiments, other elements may provide or supplement the functionality of particular circuitry.

Overview

Various embodiments of the present disclosure are directed to improved PFC controllers.

Power converters, such as AC-DC grid-connected off-the-line power converters, are widely used in industrial, consumer, and automotive applications. In some instances, these converters draw non-sinusoidal currents from the grid. In some instances, a PFC may be used on the front end of a converter to reduce harmonic content of the current drawn from the grid. Moreover, the use of a PFC may simplify the design of the DC-DC stage of a converter, for example, when a resonant topology is used to provide an output regulation range with a fixed input voltage and a relatively narrow range of variation (e.g., about 380 volts direct current (VDC) to about 420 VDC). In some instances, a relatively wide input voltage range power supply design may include the use of an input PFC stage, for example, to comply with standards, which may specify harmonic constraints on current drawn from the grid. In some instances, the addition of a PFC stage may improve the power factor of a converter.

In some instances, however, PFC topologies may have relatively high losses that originate from the input diode bridge. Bridgeless PFC topologies may reduce losses due to a lack of an input diode rectifier bridge. However, in some instances, generating suitable driving signals for power switches connected in the bridgeless topology may be relatively difficult. For example, a totem pole stage of a bridgeless PFC may include gallium nitride (GaN) devices (e.g., power switches) to provide for a relatively low on-resistance and a small parasitic capacitance between the gate, source and drain terminals. However, GaN devices may switch with relatively fast transients (e.g., edges). That is, when a GaN device switches from an ON state to an OFF state (or vice versa) the rate of variation of current and voltage are relatively high, which may reduce a performance of the switches, for example, when the GaN devices are driven using a gate driver.

In some instances, one or more gate drivers and associated GaN devices may be included in a same system in a package (SiP) to improve a performance of the GaN devices. Driving signals generated by a PFC controller for power switches in a PFC, such as GaN devices, may be based on current sensing (e.g., and voltage sensing). In some instances, while including the gate driver(s) and GaN devices in the same SiP may improve a performance of the GaN devices, current sensing in the SiP may be relatively challenging. For example, the PFC topology may include two GaN devices (e.g., transistors), in which one GaN device is on a low side and the other GaN device is on the high side. In such an example, including a resistor between the high side and the low side transistor may be relatively difficult. The current sensing may be performed using an external current transformer. However, current transformers may introduce parasitic inductance to the power loop, which may reduce a performance of the GaN devices. Moreover, some PFC systems use digital controls, such as with a micro-controller, for controlling power switches. However digital controls may necessitate increased software development, programming tools, and firmware-based end of line testing, which may be expensive and time consuming for developers in some instances.

The present disclosure is directed to improved PFC controllers. The present disclosure includes, among other things, improved systems, apparatuses, and methods to control a bridgeless totem pole PFC circuit using an analog PFC controller. For example, various aspects of the present disclosure provide for an analog PFC controller, which may include an isolated operational amplifier (e.g., a differential operation amplifier isolated from one or more power switches) to perform current sensing.

In accordance with one or more embodiments of the present disclosure, the PFC controller may include a voltage sense circuitry and a voltage rectification circuitry in which the voltage sense circuitry may be configured to sense the line-neutral voltage (which may have a sinusoidal waveform) and the voltage rectification circuitry may be configured to transform the line-neutral voltage into a voltage sense signal with a uni-directional waveform (e.g., with positive or negative values). In other words, the voltage sense circuitry may be configured to sense the line-neutral voltage during positive and negative grid voltage cycle. In some such embodiments, the voltage sense circuitry includes a difference amplifier and the voltage rectification circuitry includes a full-wave signal rectifier.

In accordance with one or more embodiments of the present disclosure, the PFC controller may include current sense circuitry and current rectification circuitry in which the current sense circuitry is configured to sense the inductor current (which may have the same sinusoidal waveform as the line-neutral voltage) and the current rectification circuitry is configured to transform the sensed current into a current sense signal with a uni-directional waveform (e.g., with negative or positive values). In other words, the current sense circuitry may be configured to sense the current in the inductor during the positive and negative grid voltage cycle. In some embodiments, the current sense circuitry (e.g., a shunt resistor) may be isolated from the PFC power stage to enable the current sense circuitry to refer the sensed inductor current to ground.

In accordance with one or more embodiments of the present disclosure, the PFC controller may include an analog control circuitry, which may be configured to receive the voltage sense signal and the current sense signal and output a pulse-width modulation (PWM) signal. For example, the analog control circuitry may include a voltage loop (used to regulate the voltage of the PFC) and a current loop (used to regulate the current of the PFC) and may use the voltage loop and the current loop (e.g., the voltage sense signal and the current sense signal) to generate the PWM. The PWM signal may be used to generate driving signals for power switches in the PFC.

In accordance with one or more embodiments of the present disclosure, the PFC controller may include the driving logic circuitry, which may be configured to receive the PWM signal and generate the driving signals for the power switches in the PFC. In some embodiments, the driving logic circuitry may generate slow leg driving signals based on whether the line-neutral voltage is on the positive half-cycle of the sine wave or the negative half-cycle of the sine wave. Additionally, in some such embodiments, the driving logic circuitry may generate fast leg driving signals based on the slow leg driving signals and the PWM signal. The PFC controller may therefore provide for improved efficiencies associated with PFC controllers, may reduce costs of PFC controller design and manufacturing, and may enable analog control of totem pole bridgeless PFC (e.g., without a micro-controller and/or firmware), among other benefits.

Exemplary Systems, Methods, and Apparatuses

Embodiments of the present disclosure herein include systems, methods, and apparatuses for controlling a bridgeless totem pole PFC, which may be implemented in various embodiments.

FIG. 1A illustrates an exemplary diagram 100-*a* of a system (e.g., PFC topology) configured to support systems and methods to control a bridgeless totem pole PFC circuit in accordance with one or more embodiments of the present disclosure.

As illustrated in the example of FIG. 1A, the system may include a PFC circuit and a PFC controller 102 for the PFC circuit. In some embodiments, the PFC circuit includes an input filter 104, a PFC choke 106, and a PFC power stage 108. In some embodiments, the PFC circuit may be configured in accordance with a bridgeless totem pole topology. In other words, the PFC circuit may be an example of a bridgeless totem pole PFC circuit. In some such embodiments, the PFC power stage 108 includes two switches that are driven at a higher switching frequency and two switches that are driven at a slower switching frequency. The two switches that are driven at a higher switching frequency (and the associated circuitry) may be referred to as a fast leg and two switches that are driven at a lower switching frequency (and the associated circuitry) may be referred to as a slow leg. As illustrated in the example of FIG. 1A, the PFC power stage 108 includes a fast leg 110 and a slow leg 114. The fast leg (FL) may include a high side (HS) switch denoted FLHS, and a low side (LS) switch denoted FLLS. Additionally, and the slow leg (SL) may include a high side (HS) switch denoted SLHS, and a low side (LS) switch denoted SLLS. As illustrated in the example of FIG. 1A, the fast leg 110 includes a FLHS switch 111-*a* and a FLLS switch 112-*a*. Additionally, the slow leg 114 may include a SLHS switch 115-*a* and a SLLS switch 116-*a*. That is, the FLHS switch 111-*a*, the FLLS switch 112-*a*, the SLHS switch 115-*a*, and the SLLS switch 116-*a* may be examples of one or more switching devices, such as one or more diodes or one or more field effect transistors (e.g., FETs). In some embodiments, the FLHS switch 111-*a*, the FLLS switch 112-*a*, the SLHS switch 115-*a*, and/or the SLLS switch 116-*a* are GaN switches. The FLHS switch 111-*a* and the FLLS switch 112-*a* may be driven at a higher frequency than the SLHS switch 115-*a* and the SLLS switch 116-*a*. In some non-limiting examples, the SLHS switch 115-*a* and the SLLS switch 116-*a* may be driven at about 60 Hertz or about 50 Hertz.

As illustrated in the example of FIG. 1A, the system may include a PFC controller 102 configured to control the PFC power stage 108 (e.g., the fast leg 110 and the slow leg 114) of the PFC circuit. For example, the PFC controller 102 may be configured to control one or more switches in the fast leg 110 (e.g., the FLHS switch 111-*a*, the FLLS switch 112-*a*) and one or more switches in the slow leg 114 (e.g., the SLHS switch 115-*a*, the SLLS switch 116-*a*). For example, the FLHS switch 111-*a*, the FLLS switch 112-*a*, the SLHS switch 115-*a*, and/or the SLLS switch 116-*a* may be configured to operate in at least two states, including an ON state and an OFF state, and the PFC controller 102 may be configured to control whether the FLHS switch 111-*a*, the FLLS switch 112-*a*, the SLHS switch 115-*a*, and/or the SLLS switch 116-*a* operates in the ON state or the OFF state at a given time.

The PFC controller 102 may control the FLHS switch 111-*a*, the FLLS switch 112-*a*, the SLHS switch 115-*a*, and/or the SLLS switch 116-*a* based sensing the line voltage (e.g., a voltage-in signal 101-*a* denoted in FIG. 1A as $V_{in}$) and the line current (e.g., a current signal 103-*a* denoted in FIG. 1A as $I_{IN}$) of the PFC circuit. Additionally, in some embodiments, the PFC controller 102 may be configured to sense (e.g., monitor, regulate) an output voltage signal 107-*a* of the PFC circuit (denoted in FIG. 1A as $V_{DC}$).

For example, a topology of the PFC may include two legs in a totem pole configuration in which the slow leg 114 (e.g., including the SLHS switch 115-*a* and the SLLS switch 116-*a*) is switched at the line frequency of the PFC circuit and the fast leg 110 (e.g., including the FLHS switch 111-*a* and the FLLS switch 112-*a*) is switched at a higher frequency based on a modulation (e.g., a 65 kHz (kilohertz) modulation) generated by the PFC controller 102, for example, to regulate the line current. In some embodiments the PFC controller 102 may be an example of an analog PFC controller.

In some examples, the PFC controller 102 may use one or more signals to control the FLHS switch 111-*a*, the FLLS switch 112-*a*, the SLHS switch 115-*a*, and/or the SLLS switch 116-*a*. In the example of FIG. 1A, the PFC controller 102 may output one or more fast driving signals 109 to a driver 105-*a* to control the FLHS switch 111-*a* and/or the FLLS switch 112-*a*. Additionally, or alternatively, the PFC controller 102 may output a slow driving signal 113-*a* to a driver 105-*b* to control the SLHS switch 115-*a* and/or may output and a slow driving signal 113-*b* to a driver 105-*c*, to driver the SLLS switch 116-*a*. Although the example of FIG. 1A illustrates the fast driving signals 109 as a single signal output to a single driver (e.g., the driver 105-*a*), it is to be understood that the fast driving signals may include multiple signals output to one or multiple drivers.

FIG. 1B illustrates an exemplary diagram 100-*b* of a PFC controller (e.g., a PFC controller 102-*b*) configured to support systems and methods to control a bridgeless totem pole PFC circuit in accordance with one or more embodiments of the present disclosure. FIG. 1B may implement or be implemented by one or more aspects illustrated by and described with reference to at least at least FIG. 1A. For example, the PFC controller 102-*b* may be an example of the PFC controller 102-*a*.

As illustrated in the example of FIG. 1B, the PFC controller 102-B may include voltage circuitry 120-A. The voltage circuitry 120-*a* may include a voltage sense circuitry 122-*a* and a voltage rectification circuitry 124-*a*. The voltage sense circuitry 122-*a* may be configured to receive one or more voltage signals and output one or more voltage sense signals. For example, the voltage sense circuitry 122-*a* may be configured to receive (e.g., may sense) a line voltage signal 117-*a* and/or a neutral voltage signal 118-*a*. In some embodiments, as illustrated in the example of FIG. 1B, the line voltage signal 117-*a* may be indicative of (e.g., representative of) a line voltage relative to ground (denoted in FIG. 1B as $V_{Line\text{-}Ground}$) and the neutral voltage signal 118-*a* may be indicative of a neutral voltage relative to ground (denoted in FIG. 1B as $V_{Neutral\text{-}Ground}$). In some such embodiments, the line voltage signal 117-*a* and/or a neutral voltage signal 118-*a* may collectively correspond to the voltage-in signal 101. In some examples, such as based on a location of the ground, the line voltage signal 117-*a* may have a waveform 125-*a* and the neutral voltage signal 118-*a* may have a waveform 125-*b*. In some embodiments, the voltage sense circuitry 122-*a* may be configured to sense (e.g., measure, determine) the line voltage with respect to neutral (denoted in FIG. 1B as $V_{Line\text{-}Neutral}$). In some such embodiments, the line voltage with respect to neutral may have a sinusoidal waveform (e.g., may be a sine wave centered to 0). In other words, the voltage sensed by the voltage sense circuitry 122-*a* may have a bi-directional waveform centered at 0 volts. In some embodiments, the voltage sense circuitry 122-*a* may be configured to output the sensed line voltage (e.g., with the bi-directional waveform) to driving logic circuitry 138-*a*. That is, the voltage sense circuitry 122-*a* may output a voltage sense signal 121-*a* to the driving logic circuitry 138-*a* in which the voltage sense signal 121-*a* may correspond to the line voltage with respect to neutral and may have a sinusoidal waveform.

Additionally, or alternatively, the voltage sense circuitry 122-*a* may be configured to output another voltage sense signal (e.g., a first voltage sense signal) to the voltage rectification circuitry 124-*a*. The voltage rectification circuitry 124 may be configured to receive the first voltage sense signal from the voltage sense circuitry 122 and output a voltage sense signal 123-*a* (e.g., a rectified voltage sense signal). For example, the voltage rectification circuitry 124-*a* may be coupled to the voltage sense circuitry 122-*a*, such that the voltage rectification circuitry 124-*a* may receive the first voltage sense signal and may output the voltage sense signal 123-*a* having the uni-directional waveform (e.g., a rectified signal, which may only have positive or negative values). In other words, in the example of FIG. 1B, the voltage circuitry 120 may use the voltage sense circuitry 122-*a* (e.g., a differential amplifier, a differential amplifier stage) to generate a voltage sense signal and the voltage rectification circuitry 124-*a* (e.g., a full-wave signal rectifier, a full-wave rectification stage) to rectify the generated voltage sense signal. The rectified voltage sense signal (e.g., the voltage sense signal 123-*a*) may have a uni-directional waveform. In other words, based on the rectification by the voltage rectification circuitry 124-*a*, the voltage sense signal 123-*a* may include positive values or negative values (e.g., all positive values or all negative values). In some embodiments, the voltage sense circuitry 122-*a* may be an example of a high-voltage sense circuit. Accordingly, as illustrated in the example of FIG. 1B, the voltage sense signal 123-*a* (e.g., and the voltage sense signal 121-*a*) may be depicted as $V_{HV}$.

As illustrated in the example of FIG. 1B, the PFC controller 102 may include current circuitry 130-*a*. The current circuitry 130-*a* may include a current sense circuitry 132-*a* and a current rectification circuitry 134-*a*. The current sense circuitry 132-*a* may be configured to receive one or more current signals and output one or more current sense signals. For example, the current sense circuitry 132-*a* may be configured to receive a current signal 103-*b* (which may be an example of the current signal 103-*a* illustrated by and described with reference to at least at least FIG. 1A). For example, the current signal 103-*b* may be indicative of (e.g., representative of, correspond to) a current associated with an inductor of the PFC circuit (e.g., an inductor ($L_{pfc}$) included in the PFC choke 106 illustrated by and described with reference to at least at least FIG. 1A). In other words, the inductor current is sensed (e.g., measured, determined) by the current sense circuitry 132-*a*. In some examples, the current sense circuitry 132-*a* may include a shunt resistor. Additionally, in some examples, the current sense circuitry 132-*a* may be isolated from a PFC power stage (e.g., the fast leg 110 and the slow leg 114 illustrated by and described with reference to at least at least FIG. 1A). In some examples, isolating the current sense circuitry 132-*a* (e.g., the shunt resistor) from the PFC power stage may enable the current sense circuitry 132-*a* to refer the sensed inductor current to ground (e.g., to refer a first current sense signal output from the current sense circuitry 132 to ground).

The current rectification circuitry 134 may be configured to receive the first current sense signal from the current sense circuitry 132-*a* and output a second (rectified) current sense signal (e.g., a current sense signal 129-*a*, denoted in FIG. 1B as $V_{CS}$). That is, the current rectification circuitry 134-*a* may be coupled to the current sense circuitry 132-*a*, such that the current rectification circuitry 134-*a* may receive the first current sense signal and output the current sense signal 129-*a*, in which the current sense signal 129-*a* may be referred to ground and also rectified. For example, the voltage-in (e.g., $V_{in}$) of the PFC circuit may be a sinusoid (e.g., a bi-directional waveform) and, as such, the current sensed by the current sense circuitry 132 may also be a sinusoid (e.g., may follow the same sinusoidal pattern, may include both positive and negative values). Accordingly, the current sense circuitry 132-*a* may be configured to output the sensed current to the current rectification circuitry 134-*a*, which may be configured to rectify the sensed current signal (e.g., output the current sense signal 129-*a*, which is referred to ground and rectified). In some examples, such as examples in which the current rectification circuitry 134-*a* is configured for negative rectification, the current sense signal 129-*a* may include negative values (e.g., even when $I_{IN}$ is positive, $V_{CS}$ may have a negative value). In other words, in some embodiments, the current sense signal 129-*a* may have a waveform 125-*d*. In some examples, whether the current sense signal 129-*a* (or the voltage sense signal 123-*a*) is positive or negative may change based on implementation.

As illustrated in the example of FIG. 1B, the PFC controller 102 may include an analog control circuitry 136-*a*, which may be configured to receive the voltage sense signal 123-*a* and the current sense signal 129-*a*. That is, the analog control circuitry 136-*a* may be coupled to the voltage rectification circuitry 124-*a* and the current rectification circuitry 134-*a*, such that the analog control circuitry 136-*a* may receive the voltage sense signal 123-*a* and the current sense signal 129-*a*. In some embodiments, the analog control circuitry 136-*a* may also be configured to receive a feedback signal (e.g., an FB signal 127-*a*). For example, the PFC controller 102-*b* may include a gain circuitry 128 configured to receive (e.g., sense) a voltage-out signal 126. In some examples, the voltage-out signal 126 may be indicative of the output voltage ($V_{DC}$) with respect to ground. Accordingly, the voltage-out signal 126 is denoted in FIG. 1B as $V_{OUT}-V_{GND}$. In other words, in some embodiments, the voltage-out signal 126 may be indicative of the output voltage signal 107-*a* associated with the PFC circuit (e.g., denoted $V_{DC}$ in the example of FIG. 1A). The gain circuitry 128 may be configured to output the FB signal 127-*a* based on the voltage-out signal 126. The analog control circuitry 136-*a* may be configured to generate (and output) a PWM signal 133-*a* to the driving logic circuitry 138-*a* for generation of one or more signals that are used to control (e.g., drive) one or more switches in the PFC circuit, such as the FLHS switch 111-*a*, the FLLS switch 112-*a*, the SLHS switch 115-*a*, and/or the SLLS switch 116-*a* illustrated by and described with reference to at least at least FIG. 1A.

As illustrated in the example of FIG. 1B, the PFC controller 102-*b* may include the driving logic circuitry 138-*a*. The driving logic circuitry 138-*a* may be configured to receive the PWM signal 133-*a* and the voltage sense signal 121-*a* and generate the one or more signals used to drive the one or more switches in the PFC circuit. In some embodiments, the driving logic circuitry 138-*a* may be configured to generate a respective signal for the FLHS switch 111-*a*, the FLLS switch 112-*a*, the SLHS switch 115-*a*, and/or the SLLS switch 116-*a* illustrated by and described with reference to at least at least FIG. 1A. For example, the driving logic circuitry 138-*a* may generate slow leg driving signals (e.g., a SLHS signal 140-*a* and a SLLS signal 141-*a* the SLHS switch 115-*a* and the SLLS switch 116-*a*, respectively) and fast driving signals (e.g., e.g., a FLHS signal 142-*a* and a FLLS signal 143-*a* the FLHS switch 111-*a* and the FLLS switch 112-*a*, respectively).

In some examples, the driving logic circuitry 138-*a* may be configured to use (e.g., may include) driving logic that is dependent on whether, at a given time, the voltage sense signal 121-*a* (e.g., representative of the voltage-in signal 101 ($V_{IN}$)) is on the positive half cycle of the sine wave or the negative half cycle of the sine wave. In other words, the driving logic circuitry 138-*a* may be configured to generate the SLHS signal 140-*a* and the SLLS signal 141-*a* (e.g., for the SLHS switch 115-*a* and the SLLS switch 116-*a*, respectively) based on the voltage sense signal 121-*a* received from the voltage sense circuitry 122-*a* and may be configured to generate the FLHS signal 142-*a* and the FLLS signal 143-*a* (e.g., for the FLHS switch 111-*a* and the FLLS switch 112-*a*, respectively) based on the SLHS signal 140-*a*, the SLLS signal 141-*a*, and the PWM signal 133-*a* received from the analog control circuitry 136-*a*. That is, the driving logic circuitry 138-*a* may be coupled to the analog control circuitry 136-*a*, such that the driving logic circuitry 138-*a* may receive the PWM signal 133-*a* and generate one or more signals for one or more switches of the PFC circuit based on the PWM signal 133-*a*. In some embodiments, the PFC controller ground may be a bulk capacitor ground.

FIG. 2A illustrates an exemplary graph 200-*a* of slow leg driving signals configured to support systems and methods to control a bridgeless totem pole PFC circuit in accordance with one or more embodiments of the present disclosure. FIG. 2A may implement or be implemented by one or more aspects illustrated by and described with reference to at least at least FIGS. 1A and 1B. For example, the SLHS signal 140-*b* and the SLLS signal 141-*b* may be examples of the SLHS signal 140-*a* and the SLLS signal 141-*a*, respectively, output by the driving logic circuitry 138-*a* illustrated by and described with reference to at least at least FIG. 1B. Additionally, voltage sense signal 121-*b* may be an example of the voltage sense signal 121-*a* output by the voltage sense circuitry 122-*a* illustrated by and described with reference to at least at least FIG. 1B.

As illustrated in the example of FIG. 2A, the SLLS signal 141-*b* and the SLHS signal 140-*b* may be generated by a line voltage polarity detection circuit. For example, in some embodiments, driving logic circuitry (e.g., the driving logic circuitry 138-*a* illustrated by and described with reference to at least at least FIG. 1B) may include line voltage polarity detection circuitry configured for line voltage polarity detection, which may be used to generate the SLHS signal 140-*b* and the SLLS signal 141-*b*, for example, based on the voltage sense signal 121-*b*. In other words, the SLHS signal 140-*b* and the SLLS signal 141-*b* may be based on a polarity of the voltage sense signal 121-*b* at a given time (e.g., whether the voltage sense signal 121-*b* is on the positive half cycle of the sine wave of the negative half cycle of the sine wave at some quantity of milliseconds (ms)).

In the example of FIG. 2A, the voltage sense signal 121-*b* (e.g., the line voltage) may be a sine wave and the SLLS signal 141-*b* may be ON (e.g., have a value of about 4 V or some other suitable voltage greater than 0) during the positive half cycle of the sine wave. Additionally, the SLLS signal 141-*b* may be OFF (e.g., have a value of 0 V) during the negative half cycle of the sine wave. The SLHS signal 140-*b* may be ON (e.g., have a value of about 4 V or some other suitable voltage greater than 0) during the negative half cycle of the sine wave. Additionally, the SLHS signal 140-*b* may be OFF (e.g., have a value of 0 V) during the positive half cycle of the sine wave. In some embodiments, driving logic circuitry (e.g., the driving logic circuitry 138-*a* illustrated by and described with reference to at least at least FIG. 1B) may use the SLHS signal 140-*b* and the SLLS signal 141-*b* to generate one or more fast leg driving signals, for example, from a PWM signal. In other words, the line voltage polarity detection circuitry may be used a totem pole PFC topology to drive one or more switches in the fast leg of a PFC circuit with a PWM signal generated, for example, by analog control circuitry.

FIG. 2B illustrates an exemplary graph 200-*b* of fast leg driving signals configured to support systems and methods to control a bridgeless totem pole PFC circuit in accordance with one or more embodiments of the present disclosure. FIG. 2B may implement or be implemented by one or more aspects illustrated by and described with reference to at least at least FIGS. 1A, 1B, and 2A. For example, the FLHS signal 142-*b* and the FLLS signal 143-*b* may be examples of the FLHS signal 142-*a* and the FLLS signal 143-*a*, respectively, output by the driving logic circuitry 138-*a* illustrated by and described with reference to at least at least FIG. 1B. Additionally, PWM signal 133-*b* may be an example of the PWM signal 133-*a* output by the analog control circuitry 136-*a* illustrated by and described with reference to at least at least FIG. 1B.

As illustrated in the example of FIG. 2B, a respective value of the FLLS signal 143-*b* and the FLHS signal 142-*b* at a given time (e.g., a quantity of microseconds (μs)) may be based on a value of the PWM signal 133-*b*. For example, driving logic circuitry (e.g., the driving logic circuitry 138-*a* illustrated by and described with reference to at least at least FIG. 1B) may be configured to split the PWM signal 133-*b* into the FLLS signal 143-*b* and the FLHS signal 142-*b*. Accordingly, in some examples, the FLLS signal 143-*b* and the FLHS signal 142-*b* may be complementary signals. That is, the FLLS signal 143-*b* may be ON (e.g., high) when the FLHS signal 142-*b* is OFF (e.g., low) and the FLLS signal 143-*b* may be OFF (e.g., low) when the FLHS signal 142-*b* is ON (e.g., high).

The driving logic circuitry may be configured to generate the FLLS signal 143-*b* and the FLHS signal 142-*b* based on one or more slow leg driving signals (e.g., the SLHS signal 140-*b* and the SLLS signal 141-*b* illustrated by and described with reference to at least at least FIG. 2A). For example, the driving logic circuitry may include logic that is based on whether a voltage sense signal (e.g., the voltage sense signal 121-*b* illustrated by and described with reference to at least FIG. 2A) is on the positive half cycle of the sine wave of the negative half cycle of the sine wave. In other words, the driving logic circuitry may be configured to drive one or more switches (e.g., the FLHS switch 111-*a*, the FLLS switch 112-*a*, the SLHS switch 115-*a*, and/or the SLLS switch 116-*a* illustrated by and described with reference to at least FIG. 1A) based on whether the voltage sense signal is on the positive half cycle of the sine wave of the negative half cycle of the sine wave. In some embodiments, the driving logic circuitry may be configured to generate the FLLS signal 143-*b* and the FLHS signal 142-*b* in accordance with the following Equations 1 and 2:

$$FLLS=\overline{A}BC+A\overline{BC} \tag{1}$$

$$FLHS=\overline{A}B\overline{C}+A\overline{B}C \tag{2}$$

in which A is representative of the SLHS (e.g., the SLHS signal 140-*b* illustrated by and described with reference to at least FIG. 2A), B is representative of the SLLS (e.g., the SLLS signal 141-*b* illustrated by and described with reference to at least FIG. 2A), and C is representative of the PWM signal 133-*b*. An example embodiment of Equations 1 and 2 (e.g., fast leg logic) is shown in the following Table 1:

TABLE 1

| | Mode | SLHS | SLLS | PWM | FLLS | FLHS |
|---|---|---|---|---|---|---|
| Zero Crossing Dead-time | (i) | 0 | 0 | 0 | 0 | 0 |
| | (ii) | 0 | 0 | 1 | 0 | 0 |
| Normal Operation | (iii) | 0 | 1 | 0 | 0 | 1 |
| | (iv) | 0 | 1 | 1 | 1 | 0 |
| | (v) | 1 | 0 | 0 | 1 | 0 |
| | (vi) | 1 | 0 | 1 | 0 | 1 |
| Invalid | (vii) | 1 | 1 | 0 | 0 | 0 |
| | (viii) | 1 | 1 | 1 | 0 | 0 |

In the example of Table 1, a value of 0 may correspond to "OFF" and a value of 1 may correspond to "ON." In other words, a value of 0 may indicate an OFF state for a switch (e.g., the FLHS switch 111-*a*, the FLLS switch 112-*a*, the SLHS switch 115-*a*, or the SLLS switch 116-*a* illustrated by and described with reference to at least FIG. 1A) and a value of 1 may indicate an ON state for the switch. As illustrated in the example of Table 1, a set of values for SLHS (e.g., the SLHS signal 140-*b*), SLLS (e.g., the SLHS signal 140-*b*), PWM (e.g., the PWM signal 133-*b*), FLHS (e.g., the FLHS signal 142-*b*), and FLLS (e.g., the FLLS signal 143-*b*) may correspond to an operation mode. In some examples, modes (i) and (ii) correspond to zero crossing dead-time modes, modes (iii), (iv), (v), and (vi) correspond to normal operation modes, and modes (vii) and (viii) correspond to invalid modes. In some embodiments, the driving logic circuitry may include a portion of circuitry configured to generate a SLHS signal (e.g., the SLHS signal 140-*b* illustrated by and described with reference to at least FIG. 2A) and another portion of circuitry configured to generate a SLLS signal (e.g., the SLLS signal 141-*b* illustrated by and described with reference to at least FIG. 2A).

FIG. 3A illustrates an exemplary diagram 300-*a* of slow leg driving logic circuitry configured to support systems and methods to control a bridgeless totem pole PFC circuit in accordance with one or more embodiments of the present disclosure. FIG. 3A may implement or be implemented by one or more aspects illustrated by and described with reference to at least FIGS. 1A, 1B, 2A, and 2B. For example, SLHS driving logic circuitry 302-*a* may be included in the driving logic circuitry 138-*a* illustrated by and described with reference to at least FIG. 1B.

As illustrated in the example of FIG. 3A, the SLHS driving logic circuitry 302-*a* (e.g., line voltage polarity detection circuitry) may be configured to generate a SLHS signal 140-*c*. The SLHS signal 140-*c* may be an example of the SLHS signal 140-*b* illustrated by and described with reference to at least reference to FIG. 2A. For example, the SLHS driving logic circuitry 302-*a* may generate the SLHS signal 140-*c* based on a voltage sense signal 121-*c* (which may be an example of a voltage sense signal illustrated by and described with reference to at least reference to FIGS. 1A, 1B, 2A, and 2B). In other words, the SLHS driving logic circuitry 302-*a* may be coupled to voltage sense circuitry (e.g., the voltage sense circuitry 122-*a* illustrated by and described with reference to at least reference to FIG. 1B), such that the SLHS driving logic circuitry 302-*a* may generate the SLHS signal 140-*c* based on the voltage sense signal 121-*c*.

In some embodiments, the SLHS driving logic circuitry 302-*a* includes a comparator 308-*a* configured to receive the voltage sense signal 121-*c*, as well as an input signal 303-*a* from a battery 310-*a*, and output the SLHS signal 140-*c*. It is to be understood that the SLHS driving logic circuitry 302-*a* may also include one or more other electrical components (e.g., resistors, capacitors) to generate the SLHS signal 140-*c*. For example, in some embodiments, the SLHS driving logic circuitry 302-*a* may include one or more electrical components, such as a resistor 306-*a*. In some embodiments, the SLHS driving logic circuitry 302-*a* may enable the driving logic circuitry to drive a SLHS switch (e.g., via the SLHS signal 140-*c*) when a value of the line voltage is negative. That is, the SLHS signal 140-*c* may drive the SLHS switch. In some embodiments, the SLHS signal 140-*c* may also be output to fast leg driving logic circuitry, for example, for generation of one or more fast leg driving signals.

FIG. 3B illustrates an exemplary diagram 300-*b* of slow leg driving logic circuitry (e.g., the SLLS driving logic circuitry 304-*a*) configured to support systems and methods to control a bridgeless totem pole PFC circuit in accordance with one or more embodiments of the present disclosure. FIG. 3B may implement or be implemented by one or more aspects illustrated by and described with reference to at least FIGS. 1A, 1B, 2A, 2B, and 3A. For example, SLLS driving logic circuitry 304-*a* may be included in the driving logic circuitry 138-*a* illustrated by and described with reference to at least FIG. 1B.

As illustrated in the example of FIG. 3B, the SLLS driving logic circuitry 304-*a* (e.g., line voltage polarity detection circuitry) may be configured to generate a SLLS signal 141-*c*. The SLLS signal 141-*c* may be an example of the SLLS signal 141-*b* illustrated by and described with reference to at least reference to FIG. 2A. For example, the SLLS driving logic circuitry 304-*a* may generate the SLLS signal 141-*c* based on a voltage sense signal 121-*d* (which may be an example of a voltage sense signal illustrated by and described with reference to at least reference to FIGS. 1A, 1B, 2A, and 2B). In other words, the SLLS driving logic circuitry 304-*a* may be coupled to voltage sense circuitry (e.g., the voltage sense circuitry 122-*a* illustrated by and described with reference to at least reference to FIG. 1B), such that the SLLS driving logic circuitry 304-*a* may generate the SLLS signal 141-*c* based on the voltage sense signal 121-*d*.

In some embodiments, the SLLS driving logic circuitry 304-*a* includes a comparator 308-*b* configured to receive voltage sense signal 121-*d*, as well as an input signal 303-*b* from a battery 310-*b*, and output the SLLS signal 141-*c*. It is to be understood that the SLLS driving logic circuitry 304-*a* may also include one or more other electrical components (e.g., resistors, capacitors) to generate the SLLS signal 141-*c*. For example, in some embodiments, the SLLS driving logic circuitry 304-*a* may include one or more electrical components, such as a resistor 306-*b*. In some embodiments, the SLLS driving logic circuitry 304-*a* may enable the driving logic circuitry to drive a SLLS switch when a value of the line voltage is positive. That is, the SLLS signal 141-*c* may drive the SLLS switch. In some embodiments, the SLLS signal 141-*c* is also output to fast leg driving logic circuitry, for example, for generation of one or more fast leg driving signals.

FIG. 4 illustrates an exemplary diagram 400 of a system configured to support systems and methods to control a bridgeless totem pole PFC circuit in accordance with one or more embodiments of the present disclosure. FIG. 4 may implement or be implemented by one or more aspects illustrated by and described with reference to at least FIGS. 1A, 1B, 2A, 2B, 3A, and 3B. For example, fast leg driving logic circuitry 402-*a* may be included in driving logic circuitry illustrated by and described with reference to at least FIGS. 1A, 1B, 2A, 2B, 3A, and 3B. As illustrated in the example of FIG. 4, the fast leg driving logic circuitry 402-*a* may be configured to generate a FLHS signal 142-*c* and a FLHS signal 142-*c*. The FLHS signal 142-*c* and the FLHS signal 142-*c* may be examples of the FLLS signal 143-*b* and the FLHS signal 142-*b*, respectively, illustrated by and described with reference to at least FIG. 2B. For example, the FLHS signal 142-*c* and the FLHS signal 142-*c* may be generated based on a SLHS signal 140-*d*, a SLLS signal 141-*d*, and a PWM signal 133-*c*, which may be examples of the corresponding signals illustrated by and described with reference to at least FIGS. 2A and 2B. In other words, the fast leg driving logic circuitry 402-*a* may be coupled to slow leg driving logic circuitry (e.g., the SLHS driving logic circuitry 302-*a* and the SLLS driving logic circuitry 304-*a* illustrated by and described with reference to at least FIGS. 3A and 3B), as well as to analog control circuitry (e.g., the analog control circuitry 136-*a* illustrated by and described with reference to at least FIG. 2B), such that the fast leg driving logic circuitry 402-*a* may generate the FLHS signal 142-*c* and the FLHS signal 142-*c* from the PWM signal 133-*c* and based on the SLHS signal 140-*d* the SLLS signal 141-*d*.

As illustrated in the example of FIG. 4, the fast leg driving logic circuitry 402-*a* of the driving logic circuitry includes input circuitry 406 and logic circuitry 404. The logic circuitry 404 may, in some examples, include one or more gate driver circuits (e.g., two gate drivers with dead-time insertion). In some embodiments, the fast leg driving logic circuitry 402-*a* may include a portion of circuitry configured for generating the FLHS signal 142-*c* and another portion of circuitry configured for generating the FLLS signal 143-*c*.

In the example of FIG. 4, the input circuitry 406 may be configured to receive the SLHS signal 140-*d* and the SLLS signal 141-*d* from voltage sense circuitry 122-*b* (e.g., from the slow leg driving logic circuitry coupled to the voltage sense circuitry 122-*b*). The input circuitry 406 may also be configured to receive the PWM signal 133-*c* from analog control circuitry 136-*b* and a PWM STOP signal 139-*a* from disable logic circuitry 150-*a*. In some embodiments, the disable logic circuitry 150-*a* may be included in the analog control circuitry 136-*b*. Additionally, in some embodiments, the fast leg driving logic circuitry 402-*a* may include first logic gates 408 (e.g., a first logic gate 408-*a*, a first logic gate 408-*b*, a first logic gate 408-*c*, and a first logic gate 408-*d*), which may be coupled to second logic gates 410 (e.g., a second logic gate 410-*a* and a second logic gate 410-*b*). As illustrated in the example of FIG. 4, a dead-time insertion 414 may be provided in between the first logic gates 408 and the second logic gates 410. The dead-time insertion 414 may, in some examples, prevent one or more fast leg switches (e.g., the FLHS switch 111-*a* and/or the FLLS switch 112-*a* illustrated by and described with reference to at least FIG. 1A) from being driven ON at the same time. For example, the dead-time insertion 414 may generate OFF-time in which a non-inverted low side (LS) switch (e.g., the FLLS switch 112-*a*) and an inverted high side (HS) switch (e.g., the FLLS switch 112-*a*) are both low. The OFF-time may be referred to as dead-time, and the dead-time insertion 414 may reduce a likelihood of (e.g., may prevent) the LS and HS switching simultaneously. In some embodiments, the dead-time may be based on a dead-time setpoint signal 407-*a*.

In some embodiments, the first logic gates 408 (e.g., each first logic gate 408) may be configured to receive the SLHS signal 140-*d*, the SLLS signal 141-*d*, and the PWM signal 133-*c* and implement the fast leg logic (e.g., Equations 1 and 2) based on the received signals. In other words, the first logic gates 408 may be configured to generate the FLHS signal 142-*c* and the FLLS signal 143-*c* based on the SLHS signal 140-*d*, the SLLS signal 141-*d*, and the PWM signal 133-*c* and in accordance with Equations 1 and 2.

In some examples, a PFC circuit may include a switch driven via a PWM signal. In such examples, the switch may be disabled by interrupting (e.g., turning off) a PWM signal used to drive the switch. In some other examples, such as in the example of FIG. 1A, a PFC circuit may include multiple switches (e.g., a high side switch and a low side switch) driven by complementary signals, which may be generated from a same PWM signal. In such an example, interruption of the PWM signal may not simultaneously disable multiple switches. For example, interrupting the signal that drives the low side switch (e.g., to disable the low side switch) may enable the high side switch. Accordingly, as illustrated in the example of FIG. 4, the fast leg driving logic circuitry 402-*a* may include AND logic gates 412 (e.g., an AND logic gate 412-*a* and an AND logic gate 412-*b*), which are configured to simultaneously disable multiple switches. For example, the fast leg driving logic circuitry may use the AND logic gates 412 to simultaneously turn off multiple switches (e.g., the FLHS switch 111-*a* and the FLLS switch 112-*a*) based on the PWM STOP signal 139-*a*. In some embodiments, the fast leg driving logic circuitry 402-*a* may be configured to disable multiple switches when a value of the PWM STOP signal 139-*a* is 0. In some examples, a PFC controller (e.g., the PFC controller 102-*b* illustrated by and described with reference to at least FIG. 1B) may use the disable logic circuitry 150-*a* (e.g., the PWM STOP signal 139-*a*) in accordance with a protection scheme. For example, the PFC controller may use the PWM STOP signal 139-*a* to disable multiple switches in response to detecting a burst mode (e.g., at light load the PFC controller may determine to turn OFF both of the FLHS switch 111-*a*, the FLLS switch 112-*a*, the SLHS switch 115-*a*, and/or the SLLS switch 116-*a* illustrated by and described with reference to at least FIG. 1A).

FIG. 5 illustrates an exemplary diagram 500 of driving logic circuitry configured to support systems and methods to control a bridgeless totem pole PFC circuit in accordance with one or more embodiments of the present disclosure. FIG. 5 may implement or be implemented by one or more aspects illustrated by and described with reference to at least FIGS. 1A, 1B, 2A, 2B, 3A, 3B, and 4. For example, driving logic circuitry 138-*b* may be an example of the driving logic circuitry 138-*a* illustrated by and described with reference to at least FIG. 1B.

In some embodiments, the driving logic circuitry 138-*b* may be included in an integrated circuit (IC) with other circuitry associated with a PFC controller. As illustrated in the example of FIG. 5, the driving logic circuitry 138-*b* may be included in an IC with voltage sense circuitry 122-*c*. The voltage sense circuitry 122-*c* may be an example of voltage sense circuitry 122-*a* illustrated by and described with reference to at least FIG. 1B. For example, the voltage sense circuitry 122-*c* may be configured to receive a line voltage signal 117-*b* and a neutral voltage signal 118-*b*. The line voltage signal 117-*b* and the neutral voltage signal 118-*b* may be examples of the line voltage signal 117-*a* and the neutral voltage signal 118-*a*, respectively, illustrated by and described with reference to at least FIG. 1B. For example, the voltage sense circuitry 122-*c* may be configured to output a voltage sense signal 121-*e* based on the line voltage signal 117-*b* and the neutral voltage signal 118-*b*. Accordingly, the voltage sense signal 121-*e* may be an example of the voltage sense signal 121-*b* illustrated by and described with reference to at least FIG. 2A. For example, the voltage sense signal 121-*e* may have a sinusoidal waveform.

In some examples, SLHS driving logic circuitry 302-*b* and SLLS driving logic circuitry 304-*b* may use the voltage sense signal 121-*e* to generate a SLHS signal 140-*e* and a SLLS signal 141-*c*, respectively. The SLHS driving logic circuitry 302-*b* may be coupled to FLHS driving logic circuitry 502-*a*, which may be configured to generate FLHS signal 142-*d* based on the SLHS signal 140-*c* (e.g., received from the SLHS driving logic circuitry 302-*b*) and the PWM signal 133-*d*. That is, the FLHS driving logic circuitry 502-*a* may be a portion of fast leg driving logic circuitry 402-*a* that is configured to generate the FLHS signal 142-*d*. Additionally, in some embodiments, the SLLS driving logic circuitry 304-*b* may be coupled to FLLS driving logic circuitry 504-*a*, which may be configured to generate the FLLS signal 143-*d* based on the SLLS signal 141-*c* (e.g., received from the SLLS driving logic circuitry 304-*b*) and the PWM signal 133-*d*. That is, the FLLS driving logic circuitry 504-*ab* may be a portion of the fast leg driving logic circuitry 402-*a* configured to generate the FLLS signal 143-*d*. In some examples of the driving logic circuitry 138-*b*, the FLHS signal 142-*d* is output to (e.g., drives) a FLHS switch (e.g., the FLHS switch 111-*a* illustrated by and described with reference to at least FIG. 1A) and the FLLS signal 143-*d* is output to (e.g., drives) a FLLS switch (e.g., the FLLS switch 112-*a* illustrated by and described with reference to at least FIG. 1A). In some embodiments, the FLHS driving logic circuitry 502-*a* may include one or more gate drivers (e.g., two gate drivers with dead-time insertion). Additionally, in some embodiments, the driving logic circuitry 138-*b* may include one or more logic gates (e.g., the first logic gates 408 illustrated by and described with reference to at least FIG. 4 may be imbedded in the driving logic circuitry 138-*b*).

FIG. 6 illustrates an exemplary diagram 600 of current circuitry configured to support systems and methods to control a bridgeless totem pole PFC circuit in accordance with one or more embodiments of the present disclosure. FIG. 6 may implement or be implemented by one or more aspects illustrated by and described with reference to at least FIGS. 1A, 1B, 2A, 2B, 3A, 3B, 4, and 5. For example, current circuitry 130-*b* may include current sense circuitry 132-*b* and current rectification circuitry 134-*b*, which may be examples of the corresponding circuitry illustrated by and described with reference to at least FIG. 1B.

As illustrated in the example of FIG. 6, the current sense circuitry 132-*b* may be configured for isolated current sensing (e.g., with a shunt resistor). Additionally, as illustrated in the example of FIG. 6, the current sense circuitry 132-*b* may be configured to output one or more current sense signals to the current rectification circuitry 134-*b*, which may be coupled to analog control circuitry (e.g., the analog control circuitry 136-*a* illustrated by and described with reference to at least FIG. 1B). In other words, rectification circuitry may be added to the current sense circuitry 132-*b* (e.g., after the current is sensed) in order to rectify the output of the current sense circuitry 132-*b* (e.g., a sinusoid).

In some embodiments, the current rectification circuitry 134-*b* includes a high-frequency full-wave rectification circuitry. In some such embodiments, as illustrated in the example of FIG. 6, the high-frequency full-wave rectification circuitry includes operational amplifiers 602 (e.g., an operational amplifier 602-*a* and an operational amplifier 602-*b*) to perform the rectification. It is to be understood that the current rectification circuitry 134-*b* may also include one or more other electrical components (e.g., resistors, capacitors) that support rectification of one or more signals by the current rectification circuitry 134-*b*. The current sense circuitry 132-*a* may output, to the operational amplifiers 602 (e.g., to both the operational amplifier 602-*a* and the operational amplifier 602-*b*), non-inverted current sense signals 604 (e.g., non-inverted current sense signal 604-*a* and non-inverted current sense signal 604-*b*, denoted in FIG. 6 as $V_{CSP}$) and inverted current sense signals 605 (e.g., inverted current sense signal 605-*a* and inverted current sense signal 605-*b*, denoted in FIG. 6 as $V_{CSN}$). In some embodiments, the non-inverted current sense signals 604 and the inverted current sense signals 605 may have a sinusoidal waveform (e.g., may be sine waves). For example, the non-inverted current sense signals 604 may have a waveform 125-*f*. The current rectification circuitry 134-*b* may be configured (e.g., using the operational amplifiers 602) to output a rectified signal (e.g., current sense signal 129-*b*) based on the non-inverted current sense signals 604 and the inverted current sense signals 605. Accordingly, in some examples, the current sense signal 129-*b* may have a waveform 125-*e*, which may be an example of the waveform 125-*d* illustrated by and described with reference to at least FIG. 1B. The current rectification circuitry 134 may output the current sense signal 129-*b* to the analog controller. Although the example of FIG. 6 illustrates the output of the current sense circuitry 132-*b* being rectified using a negative signal, the output of the current sense circuitry 132-*b* may be rectified using a positive signal or a negative signal. In some examples, whether the output of the current sense circuitry 132-*b* is rectified using a positive signal or a negative signal (e.g., whether the current sense signal 129-*b* has negative values or positive values) may be based on the analog controller to which the rectified signal is output. In some embodiments, the current sense circuitry 132-*b* and the current rectification circuitry 134-*b* may be configured to operate at a relatively high bandwidth (e.g., to enable sensing of the ripple on the inductor current). In some non-limiting examples, the current sense circuitry 132-*b* may be configured to operate (e.g., to perform current sensing) at about 65 kHz or about 133 kHz. Additionally, in some examples, the current circuitry 130-*b* may be an example of an isolated current sensing device, which includes integrated operational amplifiers for rectification. For example, the current circuitry 130-*b* may be an example of a current sense IC, which includes a rectification stage. In other words, the current circuitry 130-*b* may be an example of a single device, which may sense the current and rectify it.

FIG. 7 illustrates an exemplary diagram 700 of voltage circuitry configured to support systems and methods to control a bridgeless totem pole PFC circuit in accordance with one or more embodiments of the present disclosure. FIG. 7 may implement or be implemented by one or more aspects illustrated by and described with reference to at least FIGS. 1A, 1B, 2A, 2B, 3A, 3B, 4, 5, and 6. For example, voltage circuitry 120-*b* may include voltage sense circuitry 122-*d* and voltage rectification circuitry 124-*b*, which may be examples of the corresponding circuitry illustrated by and described with reference to at least FIG. 1B.

The voltage sense circuitry 122-*d* may be configured to receive a line voltage signal 117-*c* and/or a neutral voltage signal 118-*c*. The line voltage signal 117-*c* and the neutral voltage signal 118-*c* may be examples of the corresponding signals illustrated by and described with reference to at least FIG. 1B. For example, the line voltage signal 117-*c* may correspond to a line voltage relative to ground (denoted in FIG. 7 as $V_{Line\text{-}Ground}$) and the neutral voltage signal 118-*c* may correspond to a neutral voltage relative to ground (denoted in FIG. 7 as $V_{Neutral\text{-}Ground}$). As illustrated in the example of FIG. 7, the voltage sense circuitry 122-*d* may be configured to output a first voltage sense signal 119-*a* to the voltage rectification circuitry 124-*b*. The first voltage sense signal 119-*a* may be representative of the line voltage with respect to neutral (denoted in FIG. 7 as $V_{Line\text{-}Neutral}$). In other words, the voltage sense circuitry 122-*d* may sense (e.g., measure, determine) the line voltage with respect to neutral. In some embodiments, the first voltage sense signal 119-*a* may include (e.g., may be a same signal as) a voltage sense signal output to driving logic circuitry (e.g., the voltage sense signal 121-*a* illustrated by and described with reference to FIG. 1B).

In some embodiments, the first voltage sense signal 119 (e.g., $V_{Line\text{-}Neutral}$) may have a sinusoidal waveform (e.g., may be a sine wave centered to 0). In other words, the voltage sensed by the voltage sense circuitry 122-*d* may have a bi-directional waveform centered at 0 volts. Accordingly, in some embodiments, the voltage sense circuitry 122-*d* may be coupled to (and may thus output the first voltage sense signal 119-*a* to) the voltage rectification circuitry 124-*b*. The voltage rectification circuitry 124-*b* may be configured to receive the first voltage sense signal 119-*a* and output a voltage sense signal 123-*b*. In other words, the voltage rectification circuitry 124-*b* may be configured to rectify the first voltage sense signal 119-*a*. The voltage sense signal 123-*b* may be an example of the voltage sense signal 123-*a* illustrated by and described with reference to at least FIG. 1B. For example, the voltage sense signal 123-*b* may be a rectified signal with positive values or negative values. In the example of FIG. 7, the voltage sense signal 123-*b* may have a waveform 125-*g*, which may be an example of the waveform 125-*c* illustrated by and described with reference to at least FIG. 1B.

In some embodiments, as illustrated in the example of FIG. 7, the voltage rectification circuitry 124-*b* may be an example of a full-wave signal rectifier. For example, the voltage rectification circuitry 124-*b* may include one or more diodes 702 (e.g., a diode 702-*a*, a diode 702-*b*) and one or more operational amplifiers (e.g., an operational amplifier 704-*a*, an operational amplifier 704-*b*) to perform full-wave rectification. It is to be understood that the voltage rectification circuitry 124-*b* may also include one or more other electrical components to perform full-wave rectification. For example, the voltage rectification circuitry 124-*b* may include one or more resistors 706 (e.g., a resistor 706-*a*, a resistor 706-*b*, a resistor 706-*c*, a resistor 706-*d*, a resistor 706-*e*, a resistor 706-*f*, a resistor 706-*g*), among other electrical components.

FIG. 8 illustrates an exemplary diagram 800 of voltage sense circuitry configured to support systems and methods to control a bridgeless totem pole PFC circuit in accordance with one or more embodiments of the present disclosure. FIG. 8 may implement or be implemented by one or more aspects illustrated by and described with reference to at least FIGS. 1A, 1B, 2A, 2B, 3A, 3B, 4, 5, 6, and 7. For example, voltage sense circuitry 122-*e* may be an example of the corresponding circuitry illustrated by and described with reference to at least FIG. 1B.

In some embodiments, as illustrated in the example of FIG. 8, the voltage sense circuitry 122-*e* may include a differential amplifier (e.g., a difference amplifier). For example, the voltage sense circuitry 122-*e* may use an operational amplifier 802 to perform voltage sensing. It is to be understood that the voltage sense circuitry 122-*e* may also include one or more other electrical components (e.g., resistors, capacitors) to perform the voltage sensing.

In some embodiments, the voltage sense circuitry 122-*e* may be configured to receive a line voltage signal 117-*d* and/or a neutral voltage signal 118-*d*. The line voltage signal 117-*d* and the neutral voltage signal 118-*d* may be examples of the corresponding signals illustrated by and described with reference to at least FIG. 1B. For example, the line voltage signal 117-*d* may correspond to a line voltage relative to ground (denoted in FIG. 8 as $V_{Line\text{-}Ground}$) and the neutral voltage signal 118-*d* may correspond to a neutral voltage relative to ground (denoted in FIG. 8 as $V_{Neutral\text{-}Ground}$). As illustrated in the example of FIG. 8, the voltage sense circuitry 122-*e* may be configured to output a first voltage sense signal 119-*b* to voltage rectification circuitry. The first voltage sense signal 119-*b* may be representative of the line voltage with respect to neutral (denoted in FIG. 8 as $V_{Line\text{-}Neutral}$). In other words, the voltage sense circuitry 122-*e* may sense (e.g., measure, determine) the line voltage with respect to neutral. In some embodiments, the voltage sense circuitry 122-*e* may be configured to operate (e.g., perform voltage sensing) at relatively low frequencies. In some non-limiting examples, the voltage sense circuitry 122-*e* may be configured to operate at about 60 Hz or about 50 Hz.

FIG. 9 illustrates an exemplary diagram 900 of analog control circuitry configured to support systems and methods to control a bridgeless totem pole PFC circuit in accordance with one or more embodiments of the present disclosure. FIG. 9 may implement or be implemented by one or more aspects illustrated by and described with reference to at least FIGS. 1A, 1B, 2A, 2B, 3A, 3B, 4, 5, 6, 7, and 8. For example, analog control circuitry 136-*c* may be an example of the analog control circuitry 136-*a* illustrated by and described with reference to at least FIG. 1B.

In some embodiments, the analog control circuitry 136-*c* includes a current loop (e.g., an inner loop) and a voltage loop (e.g., an outer loop). The analog control circuitry 136-*c* may use the voltage loop for a voltage regulation (e.g., to regulate the output DC bus of the PFC circuit) and may use the current loop for current regulation (e.g., to regulate the current). In some examples, the analog control circuitry 136-*c* may use the current loop and the voltage loop to generate a PWM signal (e.g., the PWM signal illustrated by and described with reference to at least FIG. 1B) for driving one or more switches (e.g., the FLHS switch 111-*a*, the FLLS switch 112-*a*, the SLHS switch 115-*a*, and the SLLS switch 116-*a* illustrated by and described with reference to at least FIG. 1A).

As illustrated in the example of FIG. 9, the analog control circuitry 136-*c* may be configured with one or more protection schemes (e.g., PWM STOP logic), which are configured to simultaneously disable multiple switches (e.g., the FLHS switch 111-*a*, the FLLS switch 112-*a*, the SLHS switch 115-*a*, and the SLLS switch 116-*a* illustrated by and described with reference to at least FIG. 1A). In some embodiments, the analog control circuitry 136-*c* may be configured to disable multiple switches via a PWM STOP signal 139-*b* in response to one or more triggers. The PWM STOP signal 139-*b* may be an example of the PWM STOP signal 139-*a* illustrated by and described with reference to at least FIG. 4. For example, the analog control circuitry 136-*c* may use the PWM STOP signal 139-*b* to simultaneously turn OFF multiple switches based on a burst mode (BM), a disable (DIS) mode, over voltage protection (OVP), an idle (IDLE) mode, feedback disconnection (FBD), over current protection (OCP), and/or zero current detection (ZCD) (e.g., for discontinuous conduction mode (DCM) implementation).

As illustrated in the example of FIG. 9, the analog control circuitry 136-*c* may include IC logic 902-*a*. The IC logic 902—may be configured to receive one or more signals, which may trigger the analog control circuitry 136-*c* to disable multiple switches via the PWM STOP signal 139-*b* (e.g., to set a value of the PWM STOP signal 139-*b* to 0). For example, the analog control circuitry 136-*c* may include BM circuitry 906, which may be configured to output a BM signal 905-*a* to the IC logic 902-*a* in response to detection of a burst mode (e.g., in a PFC circuit). Additionally, or alternatively, the analog control circuitry 136-*c* may include disable logic circuitry 150-*b*, which may be an example of the disable logic circuitry 150-*a* illustrated by and described with reference to at least FIG. 4. For example, the disable logic circuitry 150-*b* may be configured to output a DIS signal 903-*a* to the IC logic 902-*a* based on a determination to disable multiple switches. Additionally, in some examples, the analog control circuitry 136-*c* may include logic circuitry 910-*a*. The logic circuitry 910-*a* may be configured to output an OVP signal 911-*a* to the IC logic 902-*a* in response to sensing overvoltage (e.g., at a DC bus associated with the PFC circuit). Additionally, or alternatively, the logic circuitry 910-*a* may be configured to output an FBD signal 909-*a* to the IC logic 902-*a* in response to detecting FBD. Additionally, or alternatively, the logic circuitry 910-*a* may be configured to output an IDLE signal 907-*a* to the IC logic 902-*a* in response to a determination to operate in an IDLE mode. The logic circuitry 910-*a* may, in some examples, be configured to output the OVP signal 911-*a*, the FBD signal 909-*a* and/or the IDLE signal 907-*a* based on an FB signal 127-*b*. The FB signal 127-*b* may be an example of the FB signal 127-*a* illustrated by and described with reference to at least FIG. 1B.

In some examples, the IC logic 902-*a* may be configured to receive one or more OCP signals 921-*a*, for example, in response to detection of overcurrent. The IC logic 902-*a* may, in some examples, be configured to simultaneously disable multiple switches (e.g., via the PWM STOP signal 139-*b*) in response to the DIS signal 903-*a*, the BM signal 905-*a*, the IDLE signal 907-*a*, the FBD signal 909-*a*, the OVP signal 911-*a*, and/or the OCP signals 921-*a*. In some embodiments, the IC logic 902-*a* may also be configured to output an HVON signal 927-*a* and/or an XCAP signal 929-*a*. The HVON signal 927-*a* (also denoted HV_ON) refers to a high voltage startup signal. In some embodiments, the HVON signal 927-*a* may be used if the analog control circuitry 136-*c* includes high voltage startup circuitry. Additionally, the XCAP signal 929-*a* refers to a signal used to turn on a discharging of an X-Capacitor in an EMI filter. The XCAP signal 929-*a* is used for discharging the EMI filter to a level (e.g., a safe level), which enables the PFC circuit to satisfy one or more safety regulations.

In some examples, the IC logic 902-*a* may output one or more signals based on a CSD signal 933-*a*. The CSD signal 933-*a* refers to a current sense disconnection signal. In some embodiments, if the CS pin voltage is higher than a threshold (e.g., an internal CDS voltage (VCSD) threshold) a failure of the current sensing circuit is detected, which may trigger the PFC circuit to stops switching activity, thereby reducing energy consumption. In some embodiments, the analog control circuitry 136-*c* may use the PWM STOP logic (e.g., the PWM STOP signal 139-*b*) to avoid current inversion, for example, when synchronous rectification is used. As described herein, the PWM STOP logic (also denoted as PWM stop logic) may include one or more portions of the analog control circuitry 136-*c*, such as, for example, the IC logic 902-*a*, the BM circuitry 906, the disable logic circuitry 150-*a*, and/or the IC logic 902-*a*.

In some embodiments, the analog control circuitry 136-*c* may use a comparator 922-*a* and a COMP pin threshold (e.g., a COMP signal 917-*a*) to manage burst modes. The COMP signal 917-*a* may correspond to an output of an error amplifier. For example, a compensation network may be placed between a COMP pin and an inverting input (INV) associated with the analog control circuitry 136-*c* to achieve stability of the voltage control loop and ensure high power factor and low total harmonic distortion (THD). In some examples, the analog control circuitry 136-*c* may include ZCD logic circuitry 908-*a*, which is configured to output a ZCD signal 913-*a* (and an FW signal) in response to detection of zero current. For example, the ZCD logic circuitry 908-*a* may be coupled to multiplier circuitry 912-*a* (e.g., a $V_{in}$ and multiplier estimator), which may be configured to receive the FW signal and the ZCD signal 913-*a*. The FW signal may be used to indicate a time during which boost inductor current is decaying. The multiplier circuitry 912 may be configured to output a $V_G(\theta)$ signal 925-*a* to a first THD-optimizer 914-*a* for DCM and a second THD-optimizer 915-*a* for continuous conduction mode (CCM). In some embodiments, the first THD-optimizer 914-*a*, together with the second THD-optimizer 915-*a*, may be configured to output a current sense reference signal 916-*a* (denoted in FIG. 9 as $V_{CS\_REF}(\theta)$) to a comparator 924-*a*, which is coupled to a latch 920-*a* (e.g., an FF-SR latch). In some embodiments, the second THD-optimizer 915-*a* may also be coupled to an OFF-time modulator 918-*a*, which may also be coupled to the latch 920-*a*. The latch 920-*a* may be coupled to a gate driver 928-*a*, which is configured to output a gate driver signal (GD signal 919-*a*). For example, the latch 920-*a* may be configured to output a Q signal 923-*a* to the gate driver 928-*a*.

In some embodiments, the multiplier circuitry 912-*a* may use the $V_C$ voltage, and, based on the FW signal and the ZCD signal 913-*a*, generate the $V_G(\theta)$ signal 925-*a* in accordance with the following Equation 1:

$$V_G(\theta) = V_C \cdot K_1 \cdot \frac{V_{IN}(\theta)}{V_{OUT}} \tag{1}$$

in which $K_1$ corresponds to a circuitry gain and $V_{IN}(\theta)=|V_{AC}(\theta)|=V_{in,pk}\cdot\sin(\theta)$ (e.g., with $0\leq\theta\leq\pi$, as a result of a rectification operation output by an input bridge) is an instantaneous line input voltage. In some such embodiments, the $V_G(\theta)$ signal 925-*a* is managed by the first THD-optimizer 914-*a* (e.g., the THD-DCM optimizer), which may act as a simple gain ($K_2$) in a CCM operation. In DCM operation, the first THD-optimizer 914-*a* may shape the $V_G(\theta)$ voltage to achieve a sinusoidal input current, $V_{CS\_REF}(\theta)$. For example, the first THD-optimizer 914-*a* may be configured to generate current sense reference signal 916-*a* ($V_{CS\_REF}(\theta)$) in accordance with the following Equation 2:

$$V_{CS_{REF}}(\theta) = V_G(\theta) \cdot K_2 \cdot \frac{T_{ON}(\theta) + T_{FW}(\theta) + T_R(\theta)}{T_{ON}(\theta) + T_{FW}(\theta)} \tag{2}$$

in which, during the $T_{ON}(\theta)$ and $T_{FW}(\theta)$ time, the boost inductor $L_P$ is demagnetizing or fully demagnetized, respectfully, and $K_1K_2$ is the equivalent multiplier gain.

The analog control circuitry 136-*c* may be configured to receive a current sense signal 129-*c* (denoted in FIG. 9 as CS). The current sense signal 129-*c* may be an example of the current sense signal 129-*a* illustrated by and described with reference to at least FIG. 1B. For example, the current sense signal 129-*c* may be an input for the comparator 924-*a* (e.g., a PWM comparator). In some examples, current flowing in a switch may be sensed through a resistor (e.g., current sense circuitry, such as current sense circuitry 132-*a* illustrated by and describe with reference to FIG. 1B) and the current sense signal 129-*c* may be representative of the resulting voltage. The comparator 924-*a* may compare the current sense signal 129-*c* with the current sense reference signal 916-*a* (e.g., an internal sinusoidal-shaped reference generated by a multiplier) to determine whether to turn off a switch (e.g., to determine a switch's turn off). In some embodiments, the analog control circuitry 136-*c* may be configured to receive a MULT signal 931-*a*, which may be an input signal to a multiplier included in the analog control circuitry 136-*c*. Additionally, in some examples, the analog control circuitry 136-*c* may be configured to receive a supply voltage signal 935-*a* (denoted in FIG. 9 as VCC), which may correspond to a supply voltage for both the signal part of the IC logic 902-*a* and the gate driver 928-*a*. It is to be understood that the analog control circuitry 136-*c* may also include one or more other electrical components (e.g., resistors, capacitors) to support one or more functionalities of the analog control circuitry 136-*c*. For example, the analog control circuitry 136-*c* may include logic gates 926-*a*, among other electrical components.

FIG. 10 illustrates an exemplary graph 1000 of signals configured to support systems and methods to control a bridgeless totem pole PFC circuit in accordance with one or more embodiments of the present disclosure. FIG. 10 may implement or be implemented by one or more aspects illustrated by and described with reference to at least FIGS. 1A, 1B, 2A, 2B, 3A, 3B, 4, 5, 6, 7, 8, and 9. For example, one or more signals illustrated in the exemplary graph 1000 may be associated with the PFC controller 102-*a* illustrated by and described with reference to at least FIG. 1A.

The graph 1000 illustrates, over a duration (in ms), an amplitude (in amps (A)) of a current signal 103-*b*, which may be examples of the corresponding signal illustrated by and described with reference to at least FIGS. 1A, 1B, 2A, 2B, 3A, 3B, 4, 5, 6, 7, 8, and 9. Additionally, graph 1000 illustrates, over a duration (in ms), an amplitude (in volts (V)) of a COMP signal 917-*b*, a current sense signal 129-*d* ($V_{CS}$), an FB signal 127-*c*, a voltage sense signal 123-*c*, the PWM signal 133-*c*, the PWM STOP signal 139-*c*, a supply voltage signal 935-*b*, a first voltage sense signal 119-*b* ($V_{Line\text{-}Neutral}$), an output voltage signal 107-*b* ($V_{DC}$), a voltage-in signal 101-*b* ($V_{IN}$), a SLLS signal 141-*f*, a SLHS signal 140-*f*, a current signal 103-*b* ($I_{IN}$), a FLLS signal 143-*e*, and the FLHS signal 142-*e*, which may be examples of the corresponding signals illustrated by and described with reference to at least FIGS. 1A, 1B, 2A, 2B, 3A, 3B, 4, 5, 6, 7, 8, and 9.

As illustrated in the example of FIG. 10, during a time interval 1002, a value of the PWM STOP signal 139-*c* is 0 and, as such, a respective value of the SLLS signal 141-*f*, the SLHS signal 140-*f*, the FLLS signal 143-*c*, and the FLHS signal 142-*e* is also 0. In other words, when a value of the PWM STOP signal 139-*c* is 0 (e.g., during the time interval 1002), the FLHS switch 111-*a*, the FLLS switch 112-*a*, the SLHS switch 115-*a*, and the SLLS switch 116-*a* are disabled (e.g., OFF).

FIG. 11 illustrates exemplary graphs 1100 associated with a PFC controller configured to support systems and methods to control a bridgeless totem pole PFC circuit in accordance with one or more embodiments of the present disclosure. FIG. 11 may implement or be implemented by one or more aspects illustrated by and described with reference to at least FIGS. 1A, 1B, 2A, 2B, 3A, 3B, 4, 5, 6, 7, 8, 9, and 10. For example, a performance illustrated by the exemplary graphs 1100 (e.g., a graph 1100-*a*, a graph 1100-*b*, a graph 1100-*c*, and a graph 1100-*d*) may be achieved by the PFC controller 102-*a* illustrated by and described with reference to at least FIG. 1A.

For example, a PFC controller configured to support systems and methods to control a bridgeless totem pole PFC circuit in accordance with one or more embodiments of the present disclosure (e.g., the PFC controller 102-*a*) may be configured to ensure that the line current ($I_{IN}$) (e.g., indicated by the current signal 103-*a* illustrated by and described with reference to at least FIG. 1A) is in phase with the output voltage ($V_{DC}$) (e.g., indicated by the output voltage signal 107-*a* illustrated by and described with reference to at least FIG. 1A) at different power levels.

For example, as illustrated in graph 1100-*a*, the PFC controller may maintain a same power factor (e.g., a power factor of about 0.9) as the output power increases from 50 watts to 250 watts. Additionally, as illustrated in graph 1100-*b*, the PFC controller may maintain a same voltage (e.g., about 400 volts) as the output power increases from 50 watts to 250 watts. Graph 1100-*c*, illustrates the efficiency of the PFC controller (e.g., a loss associated with input output conversion of the PFC controller 102) as the output power increases from 50 watts to 250 watts. Graph 1100-*d* illustrates the total harmonic distortion of the current (e.g., the harmonic distortion present in the current signal 103 ($I_{IN}$)) as the input voltage (e.g., the voltage-in signal 101 ($V_{IN}$)) increases from 110 volts to 230 volts.

FIG. 12 illustrates and exemplary diagram 1200 of a system configured to support systems and methods to control a bridgeless totem pole PFC circuit in accordance with one or more embodiments of the present disclosure. FIG. 12 may implement or be implemented by one or more aspects illustrated by and described with reference to at least FIGS. 1A, 1B, 2A, 2B, 3A, 3B, 4, 5, 6, 7, 8, 9, 10, and 11. For example, analog control circuitry 136-*d* may be an example of analog control circuitry 136-*c* illustrated by and described with reference to at least FIG. 9. As illustrated in the example of FIG. 12, the analog control circuitry 136-*c* (e.g., a PFC controller including the analog control circuitry 136-*c*, may include gate drivers 1204 associated with multiple switches of the PFC controller.

In some examples, the analog control circuitry 136-*d* may use a comparator and a COMP pin threshold (e.g., a COMP signal 917-*c*) to manage burst modes. In some examples, the analog control circuitry 136-*d* may include logic circuitry configured to output a PWM stop signal (e.g., to disable multiple switches) based on a burst mode, a disable mode, OVP, IDLE mode, FBD, OCP, and/or ZCD (e.g., for DCM implementation). For example, the logic circuitry may, in some examples, be configured to output the PWM STOP signal based on an OVP signal, an FBD signal, and/or an IDLE signal, which may be determined based on feedback (e.g., an FB signal 127-*d*). The analog control circuitry 136-*d* may be configured to receive a current sense signal 129-*c* (denoted in FIG. 12 as CS). The current sense signal 129-*e* may be an example of the current sense signal 129-*a* illustrated by and described with reference to at least FIG. 1B. Additionally, in some examples, the analog control circuitry 136-*d* may be configured to receive a supply voltage signal 935-*c* (denoted in FIG. 12 as VCC).

As illustrated in the example of FIG. 12, in some embodiments, the analog control circuitry 136-*d* may include circuitry 1202, which may include driving logic circuitry 138-*c* (which may include at least a portion of the driving logic circuitry 138-*b* illustrated by and described with reference to at least FIG. 5) and gate drivers 1204. In other words, the logic of the driving (and the voltage sensing) may be embedded inside an IC (e.g., with the analog control circuitry 136-*d*), such that the IC may receive a line voltage signal 117-*e* ($V_{Line\text{-}Ground}$) and neutral voltage signal 118-*c* ($V_{Neutral\text{-}Ground}$) and generate the signals for one or more switches in a PFC circuit (e.g., a SLLS signal 141-*g*, a SLHS signal 140-*g*, a FLLS signal 143-*f*, and a FLHS signal 142-*f*). In some embodiments, the circuitry 1202 may be coupled to the analog control circuitry 136-*d* such that the circuitry 1202 (e.g., the driving logic circuitry 138-*c* included in the circuitry 1202) may receive (e.g., via a latch) a Q signal 923-*b*. The IC (e.g., the gate drivers 1204) may include a respective gate driver for the one or more switches (e.g., each of the GaN switches) of the PFC circuit and may send logic signals (e.g., the SLLS signal 141-*g*, the SLHS signal 140-g, the FLLS signal 143-*f*, and the FLHS signal 142-*f*) to the one or more switches. The circuitry 1202 may, in some examples, include a dead-time insertion, which may generate OFF-time (e.g., dead-time) based on a dead-time setpoint signal 407-*b*. In some such embodiments, current sense circuitry, current rectification circuitry, the voltage sense circuitry, and/or the voltage rectification circuitry may be outside of the IC (e.g., the current sensing and the voltage sensing may be performed outside of the IC) and the IC may receive the current sense signal 129-*e* from the current sense circuitry (or current rectification circuitry), as well as the line voltage signal 117-*e* and the neutral voltage signal 118-*e* from the voltage sense circuitry (or voltage rectification circuitry). In other words, in the example of FIG. 12, the driving logic and gate drivers may be integrated into the analog control circuitry 136-*d* (e.g., the IC), while the current sensing, the line to neutral voltage sensing, the PWM driving logic, fault logic, diagnostics, and the switches (e.g., FETs/GaN SiP) may be external to the analog control circuitry 136-*d*. That is, in some examples, a PFC controller associated with a PFC circuit may include multiple gate drivers associated with multiple switches included in the PFC circuit. In some embodiments, the circuitry 1202 may be configured to output and/or receive one or more other signals. For example, the circuitry 1202 may be configured to receive an FLBOOT signal associated with a fast leg floating section (bootstrap) supply voltage, an SLBOOT signal associated with a slow leg floating section (bootstrap) supply voltage, an FLHB signal associated with a fast leg high side gate, an FLLG signal associated with a fast leg low side gate, an SLHB signal associated with a slow leg high side gate, and a SLLG signal associated with a slow leg low side gate.

FIG. 13 illustrates and exemplary diagram 1300 of a system configured to support systems and methods to control a bridgeless totem pole PFC circuit in accordance with one or more embodiments of the present disclosure. FIG. 13 may implement or be implemented by one or more aspects illustrated by and described with reference to at least FIGS. 1A, 1B, 2A, 2B, 3A, 3B, 4, 5, 6, 7, 8, 9, 10, 11, and 12. For example, analog control circuitry 136-*e* may be an example of analog control circuitry 136-*d* illustrated by and described with reference to at least FIG. 9.

In some examples, the analog control circuitry 136-*e* may include logic circuitry configured to output a PWM stop signal (e.g., to disable multiple switches) based on a burst mode, a disable mode, OVP, IDLE mode, FBD, OCP, and/or ZCD (e.g., for DCM implementation). For example, the logic circuitry may, in some examples, be configured to output the PWM STOP signal based on an OVP signal, an FBD signal, and/or an IDLE signal, which may be determined based on feedback (e.g., an FB signal 127-*c*). The analog control circuitry 136-*e* may be configured to receive a current sense signal 129-*f* (denoted in FIG. 13 as CS). The current sense signal 129-*f* may be an example of the current sense signal 129-*a* illustrated by and described with reference to at least FIG. 1B. Additionally, in some examples, the analog control circuitry 136-*e* may be configured to receive a supply voltage signal 935-*d* (denoted in FIG. 13 as VCC).

As illustrated in the example of FIG. 13, in some embodiments, the analog control circuitry 136-*e* may include circuitry 1302, which may include driving logic circuitry 138-*d* (which may include at least a portion of the driving logic circuitry 138-*b* illustrated by and described with reference to at least FIG. 5). In other words, the logic of the driving (and the voltage sensing) may be embedded inside an IC (e.g., with the analog control circuitry 136-*d*), such that the IC may receive a line voltage signal 117-*f* ($V_{Line\text{-}Ground}$) and neutral voltage signal 118-*f* ($V_{Neutral\text{-}Ground}$) and generate the signals for one or more switches in a PFC circuit (e.g., a SLLS signal 141-*h*, a SLHS signal 140-*h*, a FLLS signal 143-*g*, and a FLHS signal 142-*g*). The circuitry 1302 may, in some examples, include a dead-time insertion, which may generate OFF-time (e.g., dead-time) based on a dead-time setpoint signal 407-*c*. In some embodiments, the circuitry 1302 may be coupled to the analog control circuitry 136-*e* such that the circuitry 1302 (e.g., the driving logic circuitry 138-*d* included in the circuitry 1302) may receive (e.g., via a latch) a Q signal 923-*c*.

In some such embodiments, current sense circuitry, current rectification circuitry, the voltage sense circuitry, and/or the voltage rectification circuitry may be outside of the IC (e.g., the current sensing and the voltage sensing may be performed outside of the IC) and the IC may receive the current sense signal 129-*f* from the current sense circuitry (or current rectification circuitry), as well as the line voltage signal 117-*f* and the neutral voltage signal 118-*f* from the voltage sense circuitry (or voltage rectification circuitry). In other words, in the example of FIG. 13, the driving logic may be integrated into the analog control circuitry (e.g., the IC), while the current sensing, the line to neutral voltage sensing, the PWM driving logic, fault logic, diagnostics, the switches (e.g., field effect transistors (FETs), a GaN SiP), and gate drivers for the switches may be external to the analog control circuitry. In other words, a PFC controller may generate multiple signals for multiple switches in a PFC circuit and multiple gate drivers associated with the multiple switches may be external to the PFC controller.

FIG. 14 illustrates and exemplary diagram 1400 of a system configured to support systems and methods to control a bridgeless totem pole PFC circuit in accordance with one or more embodiments of the present disclosure. FIG. 14 may implement or be implemented by one or more aspects illustrated by and described with reference to at least FIGS. 1A, 1B, 2A, 2B, 3A, 3B, 4, 5, 6, 7, 8, 9, 10, 11, 12, and 13. For example, analog control circuitry 136-*f* may be an example of analog control circuitry 136-*d* illustrated by and described with reference to at least FIG. 9.

As illustrated in the example of FIG. 14, a PFC controller may include a first portion of circuitry (e.g., an IC 1402-*a*) and a second portion of circuitry (e.g., an IC 1402-*b*) coupled to the first portion of circuitry, in which the first portion of circuitry includes at least the analog control circuitry 136-*d* and the second portion of circuitry includes at least a portion of driving logic circuitry (e.g., may include fast leg driving logic circuitry 402-*b*). For example, the system may include the IC 1402-*a* (e.g., a first controller), which includes the analog control circuitry 136-*f* with PWM STOP logic, which may be used, for example, for one or more protection schemes. Additionally, the system may include the IC 1402-*b*, which includes driving logic including, but not limited to, fast leg driving logic circuitry 402-*b*. The fast leg driving logic circuitry 402-*b* may be an example of the fast leg driving logic circuitry 402-*a* illustrated by and described with reference to at least FIG. 4. For example, the fast leg driving logic circuitry may be configured to split a PWM signal 133-*f* between a low side switch and a high side switch of a PWM circuit.

In some examples, the analog control circuitry 136-*f* may use a comparator and a COMP pin threshold (e.g., a COMP signal 917-*e*) to manage burst modes. In some examples, the analog control circuitry 136-*f* may include logic circuitry configured to output the PWM STOP signal 139-*d* (e.g., to disable multiple switches) based on a burst mode, a disable mode, OVP, IDLE mode, FBD, OCP, and/or ZCD (e.g., for DCM implementation). For example, the logic circuitry may, in some examples, be configured to output the PWM STOP signal 139-*d* based on an OVP signal, an FBD signal, and/or an IDLE signal, which may be determined based on feedback (e.g., an FB signal 127-*f*). The analog control circuitry 136-*f* may be configured to receive a current sense signal 129-*g* (denoted in FIG. 14 as CS). The current sense signal 129-*g* may be an example of the current sense signal

129-*a* illustrated by and described with reference to at least FIG. 1B. Additionally, in some examples, the analog control circuitry 136-*f* may be configured to receive a supply voltage signal 935-*e* (denoted in FIG. 14 as VCC) a MULT signal 931-*b*. In some examples, the analog control circuitry 136-*f* may include a gate driver, which is configured to output a GD signal 919-*b*.

As illustrated in the example of FIG. 14, in some embodiments, the analog control circuitry 136-*f* may be coupled to the IC 1402-*b*, which may include, at least, the fast leg driving logic circuitry 402-*b*. In some examples, the fast leg driving logic circuitry 402-*b* may be configured to generate a FLHS signal 142-*h* and a FLHS signal 142-*h*. The FLHS signal 142-*h* and the FLHS signal 142-*h* may be examples of the FLLS signal 143-*b* and the FLHS signal 142-*b*, respectively, illustrated by and described with reference to at least FIG. 2B. For example, the FLHS signal 142-*h* and the FLHS signal 142-*h* may be generated based on a SLHS signal 140-*i*, a SLLS signal 141-*i*, and a PWM signal 133-*f*, which may be examples of the corresponding signals illustrated by and described with reference to at least FIGS. 2A and 2B. In other words, the fast leg driving logic circuitry 402-*b* may be coupled to slow leg driving logic circuitry (e.g., the SLHS driving logic circuitry 302-*a* and the SLLS driving logic circuitry 304-*a* illustrated by and described with reference to at least FIGS. 3A and 3B), as well as to the analog control circuitry 136-*f* (which may be an example of the analog control circuitry 136-*a* illustrated by and described with reference to at least FIG. 2B), such that the fast leg driving logic circuitry 402-*b* may generate the FLHS signal 142-*h* and the FLHS signal 142-*h* from the PWM signal 133-*f* and based on the SLHS signal 140-*i* the SLLS signal 141-*i*. In some examples, the fast leg driving logic circuitry 402-*b* may include AND logic gates, which are configured to simultaneously disable multiple switches (e.g., the FLHS switch 111-*a* and the FLLS switch 112-*a*), for example, based on a PWM STOP signal 139-*d*.

FIG. 15 illustrates and exemplary diagram 1500 of a system configured to support systems and methods to control a bridgeless totem pole PFC circuit in accordance with one or more embodiments of the present disclosure. FIG. 15 may implement or be implemented by one or more aspects illustrated by and described with reference to at least FIGS. 1A, 1B, 2A, 2B, 3A, 3B, 4, 5, 6, 7, 8, 9, 10, 11, 12, 13, and 14. For example, analog control circuitry 136-*g* may be an example of analog control circuitry 136-*d* illustrated by and described with reference to at least FIG. 9.

As illustrated in the example of FIG. 15, a PFC controller may include a first portion of circuitry (e.g., an IC 1502-*a*) and a second portion of circuitry (e.g., an IC 1502-*b*) coupled to the first portion of circuitry, in which the first portion of circuitry includes at least the analog control circuitry 136-*d* and the second portion of circuitry includes at least a portion of driving logic circuitry (e.g., may include fast leg driving logic circuitry 402-*c*) and PFC circuitry 1504 (e.g., gate drivers associated with switches of a PFC circuit and the PFC circuit). For example, the system may include an IC 1502-*a* (e.g., a controller), which includes the analog control circuitry 136-*g* with PWM STOP logic, which may be used, for example, for one or more protection schemes. Additionally, the system may include an IC 1502-*b*, which includes driving logic including, but not limited to, fast leg driving logic circuitry 402-*c*. The fast leg driving logic circuitry 402-*c* may be an example of the fast leg driving logic circuitry 402-*a* illustrated by and described with reference to at least FIG. 4. For example, the fast leg driving logic circuitry may be configured to split a PWM signal 133-*g* between a low side switch and a high side switch of a PWM circuit. In the example of FIG. 15, the IC 1502-*b* also includes PFC circuitry 1504. The PFC circuitry 1504 may be an example of PFC circuitry (e.g., an input filter 104, a PFC choke 106, a PFC power stage 108 including a fast leg 110 and a slow leg 114) illustrated by and described with reference to at least FIG. 1A. In other words, the logic for splitting the PWM signal 133-*f* is external to the analog control circuitry 136-*f* and is instead embedded inside a switching system (e.g., a GaN system) in a SiP.

In some examples, the analog control circuitry 136-*g* may use a comparator and a COMP pin threshold (e.g., a COMP signal 917-*f*) to manage burst modes. In some examples, the analog control circuitry 136-*g* may include logic circuitry configured to output the PWM STOP signal 139-*c* (e.g., to disable multiple switches) based on a burst mode, a disable mode, OVP, IDLE mode, FBD, OCP, and/or ZCD (e.g., for DCM implementation). For example, the logic circuitry may, in some examples, be configured to output the PWM STOP signal 139-*e* based on an OVP signal, an FBD signal, and/or an IDLE signal, which may be determined based on feedback (e.g., an FB signal 127-*g*). The analog control circuitry 136-*g* may be configured to receive a current sense signal 129-*h* (denoted in FIG. 15 as CS). The current sense signal 129-*h* may be an example of the current sense signal 129-*a* illustrated by and described with reference to at least FIG. 1B. Additionally, in some examples, the analog control circuitry 136-*g* may be configured to receive a supply voltage signal 935-*f* (denoted in FIG. 15 as VCC) a MULT signal 931-*c*. In some examples, the analog control circuitry 136-*g* may include a gate driver, which is configured to output a GD signal 919-*c*.

As illustrated in the example of FIG. 15, in some embodiments, the analog control circuitry 136-*g* may be coupled to the IC 1502-*b*, which may include, at least, the fast leg driving logic circuitry 402-*c*. In some examples, the fast leg driving logic circuitry 402-*c* may be configured to generate a FLHS signal 142-*i* and a FLHS signal 142-*i*. The FLHS signal 142-*i* and the FLHS signal 142-*i* may be examples of the FLLS signal 143-*b* and the FLHS signal 142-*b*, respectively, illustrated by and described with reference to at least FIG. 2B. For example, the FLHS signal 142-*i* and the FLHS signal 142-*i* may be generated based on a SLHS signal 140-*j*, a SLLS signal 141-*j*, and a PWM signal 133-*g*, which may be examples of the corresponding signals illustrated by and described with reference to at least FIGS. 2A and 2B. In other words, the fast leg driving logic circuitry 402-*c* may be coupled to slow leg driving logic circuitry (e.g., the SLHS driving logic circuitry 302-*a* and the SLLS driving logic circuitry 304-*a* illustrated by and described with reference to at least FIGS. 3A and 3B), as well as to the analog control circuitry 136-*g* (which may be an example of the analog control circuitry 136-*a* illustrated by and described with reference to at least FIG. 2B), such that the fast leg driving logic circuitry 402-*c* may generate the FLHS signal 142-*i* and the FLHS signal 142-*i* from the PWM signal 133-*g* and based on the SLHS signal 140-*j* the SLLS signal 141-*j*. In some examples, the fast leg driving logic circuitry 402-*c* may include AND logic gates, which are configured to simultaneously disable multiple switches (e.g., the FLHS switch 111-*a* and the FLLS switch 112-*a*), for example, based on a PWM STOP signal 139-*c*.

FIG. 16 illustrates a flowchart 1600 of operations that support systems and methods to control a bridgeless totem pole PFC circuit in accordance with one or more embodiments of the present disclosure. FIG. 16 may be implemented by one or more aspects illustrated by and described with reference to at least FIGS. 1A, 1B, 2A, 2B, 3A, 3B, 4, 5, 6, 7, 8, 9, 10, 11, 12, 13, 14, and 15. For example, the operations illustrated in FIG. 16 may be implemented by a system that includes a PFC controller and a PFC circuit, which may be examples of the PFC control and PFC circuit, respectively, illustrated by and descried with reference to FIG. 1B. For example, the analog control circuitry may include a voltage loop configured to regulate an output voltage associated with the PFC circuit and a current loop configured to regulate a current associated with the PFC circuit. Additionally, in some examples, the PFC circuit may be configured in accordance with a bridgeless totem pole topology.

At operation 1602, the system may provide a PFC circuit comprising a plurality of switches. The PFC circuit may include an input filter, a PFC choke, and a PFC power stage. The PFC power stage may be an example of the PFC power stage 108 illustrated by and described with reference to at least FIG. 1A. For example, the PFC power stage may include a fast leg and a slow leg, in which the fast leg may include a FLHS switch and a FLLS switch and the slow leg may include a SLHS switch and a SLLS switch, which may be examples of the corresponding switches illustrated by and described with reference to at least FIG. 1B. For example, the plurality of switches may include GaN switches (e.g., GaN transistors).

At operation 1604, the system may provide a PFC controller coupled to the PFC circuit. In some embodiments, the PFC controller comprises a voltage rectification circuitry coupled to a voltage sense circuitry. The voltage rectification circuitry and the voltage sense circuitry may be examples of the corresponding circuitry illustrated by and described with reference to at least FIG. 1B. For example, the voltage sense circuitry may be configured to receive one or more voltage signals (e.g., a line voltage signal and/or a neutral voltage signal illustrated by and described with reference to at least FIG. 1B) and output a first voltage sense signal. The first voltage sense signal may be an example of a first voltage sense signal 119-*a* illustrated by and described with reference to at least FIG. 7. For example, the first voltage sense signal may be representative of the line voltage of the PFC circuit relative to neutral and may include a bi-directional waveform (e.g., a sinusoid). Additionally, in such an example, the voltage rectification circuitry may be configured to receive the first voltage sense signal and output a second voltage sense signal. The second voltage sense signal may be an example of the voltage sense signal 123-*a* illustrated by and described with reference to FIG. 1B. For example, the second voltage sense signal may include a first uni-directional waveform (which may be an example of the waveform 125-*c* illustrated by and described with reference to at least FIG. 1B). In some embodiments, the voltage sense circuitry includes a difference amplifier and the voltage rectification circuitry includes a full-wave signal rectifier coupled to the difference amplifier.

In some embodiments, the PFC controller may include a current rectification circuitry coupled to a current sense circuitry. The current rectification circuitry and the current sense circuitry may be examples of the corresponding circuitry illustrated by and described with reference to at least FIG. 1B. For example, the current sense circuitry may be configured to receive a current signal (which may be an example of the current signal 103-*a* illustrated by and described with reference to at least at least FIG. 1A) and output a first current sense signal. The first current sense signal may be an example of a current sense signal (e.g., a non-inverted current sense signal 604 or an inverted current sense signal 605 illustrated by and described with reference to at least FIG. 6). For example, the first current sense signal may be indicative of a current associated with an inductor of the PFC circuit (e.g., an inductor ($L_{pfc}$) included in the PFC choke 106 illustrated by and described with reference to at least at least FIG. 1A). In some examples, the first current sense signal may have a sinusoidal waveform (e.g., may be a sine wave). For example, the first current sense signal may have the waveform 125-*f* illustrated by and described with reference to at least FIG. 6. Additionally, in some embodiments, the current rectification circuitry may be configured to receive the first current sense signal and output a second current sense signal. The second current sense signal may be an example of the current sense signal 129-*b* illustrated by and described with reference to at least FIG. 6. For example, the second current sense signal may have a uni-directional waveform, such as the waveform 125-*e* illustrated by and described with reference to at least FIG. 6. In some embodiments, the current sense circuitry includes a shunt resistor and the current rectification circuitry includes a high-frequency full-wave signal rectifier (e.g., high-frequency full-wave rectification circuitry). In some such embodiments, the high-frequency full-wave signal rectifier includes two operational amplifiers. Additionally, in some embodiments, the current sense circuitry and the current rectification circuitry may be substantially isolated from a power stage of the PFC circuit (e.g., the FLHS switch 111-*a*, the FLLS switch 112-*a*, the SLHS switch 115-*a*, and/or the SLLS switch 116-*a* illustrated by and described with reference to at least FIG. 1A). For example, the current sense circuitry may be an isolated current sensing device (e.g., a current sensing IC), in which a high-frequency full-wave rectification circuitry is integrated into the isolated current sensing device. In other words, the current sense circuitry and the current rectification circuitry may be included in an isolated current sensing device, which includes integrated operational amplifiers for rectification. In some embodiments, the current sense circuitry includes a current sense IC in which the current rectification circuitry (e.g., the high-frequency full-wave rectification circuitry) corresponds to two operational amplifiers of the current sense IC.

In some embodiments, the PFC controller may include analog control circuitry coupled to the voltage rectification circuitry and the current rectification circuitry. The analog control circuitry may be an example of the analog control circuitry 136-*a* illustrated by and described with reference to at least FIG. 1B. For example, the analog control circuitry may be configured to receive the second voltage sense signal and the second current sense signal and output a PWM signal. The PWM signal may be an example of the PWM signal 133-*a* illustrated by and described with reference to at least FIG. 1B. For example, the analog control circuitry may generate the PWM signal based on the voltage loop and the current loop. In some embodiments, the analog control circuitry is also configured to output a PWM STOP signal to, for example, simultaneously disable multiple switches. The PWM STOP signal may be an example of the PWM STOP signal illustrated by and described with reference to at least FIG. 9. For example, the analog control circuitry may include a PWM stop logic circuitry configured to disable one or more switches in response to one or more triggers. The one or more triggers may include, but are not limited to, a burst mode, a disable command, OVP, an idle mode, FBD, OCP, and/or ZCD.

In some embodiments, the PFC controller may include a driving logic circuitry coupled to the analog control circuitry. The driving logic circuitry may be an example of the driving logic circuitry 138-*a* illustrated by and described with reference to FIG. 1B. For example, the driving logic circuitry may be configured to receive the PWM signal and generate a plurality of signals for the plurality of switches of the PFC (e.g., based on the PWM signal). In some embodiments, the plurality of signals includes a FLHS signal (e.g., associated with the FLHS switch), a FLLS signal (e.g., associated with the FLLS switch), a SLHS signal (e.g., associated with the SLHS switch), and a SLLS signal (e.g., associated with the SLLS switch), which may be examples of the corresponding signals illustrated by and described with reference to at least FIG. 1B. For example, the driving logic circuitry may be configured to generate the SLHS signal and the SLLS signal based on a voltage sense signal (e.g., the voltage sense signal 121-*a* illustrated by and described with reference to at least FIG. 1B) received from the voltage sense circuitry and may be configured to generate the FLHS signal and the FLLS signal based on the SLHS signal, the SLLS signal, and the PWM signal. In some examples, the SLLS signal and the SLHS signal are based on a half-cycle associated with the first voltage sense signal. For example, the first voltage sense signal (e.g., the line voltage) may be a sine wave and the SLLS signal may be ON (e.g., have a value of about 4 V or some other suitable voltage greater than 0) during the positive half-cycle of the sine wave. Additionally, the SLLS signal may be OFF (e.g., have a value of 0 V) during the negative half-cycle of the sine wave. The SLHS signal may be ON (e.g., have a value of about 4 V or some other suitable voltage greater than 0) during the negative half-cycle of the sine wave. Additionally, the SLHS signal may be OFF (e.g., have a value of 0 V) during the positive half-cycle of the sine wave. Additionally, in some embodiments, the FLLS signal and the FLHS signal are on the SLLS signal, the SLHS signal, and the PWM signal. For example, driving logic circuitry may be configured to split the PWM signal into the FLLS signal and the FLHS signal, such that the FLLS signal and the FLHS signal may be complementary signals. That is, the FLLS signal may be ON (e.g., high) when the FLHS signal is OFF (e.g., low) and the FLLS signal may be OFF (e.g., low) when the FLHS signal is ON (e.g., high). In some embodiments, the driving logic circuitry may be configured to generate one or more of the plurality of signals (e.g., the FLHS signal and the FLLS signal) in accordance with Equations 1 and 2.

At operation 1606, the system may operate at least one switch of the plurality of switches to change states between an on state (also denoted "ON") and an off state (also denoted "OFF") based on at least one signal of the plurality of signals. For example, the FLHS switch, the FLLS switch, the SLHS switch, and/or the SLLS switch may be configured to operate in at least two states, including an ON state and an OFF state, and the PFC controller may be configured to control whether the FLHS switch, the FLLS switch, the SLHS switch, and/or the SLLS switch operates in the ON state or the OFF state at a given time based on the FLHS signal, FLLS signal, SLHS signal, and/or the SLLS signal.

FIG. 17 illustrates an exemplary device 1700 that support systems and methods to control a bridgeless totem pole PFC circuit in accordance with one or more embodiments of the present disclosure. FIG. 17 may be implemented by one or more aspects illustrated by and described with reference to FIGS. 1A, 1B, 2A, 2B, 3A, 3B, 4, 5, 6, 7, 8, 9, 10, 11, 12, 13, 14, 15, and 16. The device 1700 may be a device for an application, apparatus, and/or a system. For example, the device 1700 may be, or be implemented in, a PFC system or a device for another application, such those described herein. The device 1700 may be a system and/or apparatus that includes a processor 1702, communication circuitry 1706, input/output circuitry 1708, PFC controller circuitry 1710, and all of which may be connected by a bus or buses 1712. It should be appreciated that, in some embodiments, the device 1700 may include or be otherwise coupled to one or more other components, such as a power source (e.g., a driver circuit, a traction inverter) and/or a load(s). The power source and/or a load(s) may be internal or external to the device 1700. For example, the power source may be coupled to at least the PFC controller circuitry 1710 via a bus or one or more connectors. Additionally, or alternatively, the load(s) may be coupled to at least the PFC controller circuitry 1710 via bus or connectors.

The processor 1702, although illustrated as a single block, may be comprised of a plurality of components and/or processor circuitry. The processor 1702 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits. In various embodiments, the processor 1702 may be configured to execute applications, instructions, and/or programs stored in the processor 1702, or otherwise accessible to the processor 1702. When executed by the processor 1702, these applications, instructions, and/or programs may enable the execution of one or a plurality of the operations and/or functions described herein. Regardless of whether it is configured by hardware, firmware/software methods, or a combination thereof, the processor 1702 may comprise entities capable of executing operations and/or functions according to the embodiments of the present disclosure when correspondingly configured.

The communication circuitry 1706 may be implemented as a circuit, hardware, computer program product, or a combination thereof, which is configured to receive and/or transmit data from/to another component or apparatus. The computer program product may use computer-readable program instructions stored on a computer-readable medium (e.g., memory) and executed by a processor 1702. In various embodiments, the communication circuitry 1706 (as with other components discussed herein) may be at least partially implemented as part of the processor 1702 or otherwise controlled by the processor 1702. The communication circuitry 1706 may communicate with the processor 1702, for example, through a bus 1712. Such a bus 1712 may connect to the processor 1702, and it may also connect to one or more other components of the processor 1702. The communication circuitry 1706 may be comprised of, for example, transmitters, receivers, transceivers, network interface cards and/or supporting hardware and/or firmware/software and may be used for establishing communication with another component(s), apparatus (cs), and/or system(s). The communication circuitry 1706 may be configured to receive and/or transmit data that may be stored by memory by using one or more protocols that can be used for communication between components, apparatuses, and/or systems.

The input/output circuitry 1708 may communicate with the processor 1702 to receive instructions input by an operator and/or to provide audible, visual, mechanical, or other outputs to an operator. The input/output circuitry 1708 may comprise supporting devices, such as a keyboard, a mouse, a user interface, a display, a touch screen display, lights (e.g., warning lights), indicators, speakers, and/or other input/output mechanisms. The input/output circuitry 1708 may comprise one or more interfaces to which supporting devices may be connected. In various embodiments, aspects of the input/output circuitry 1708 may be implemented on a device used by the operator to communicate with the processor 1702. The input/output circuitry 1708 may communicate with memory, the communication circuitry 1706, and/or any other component, for example, through a bus 1712.

The PFC controller circuitry 1710 may be an example of a PFC controller illustrated by and described with reference to at least FIGS. 1A and 1B. For example, the PFC controller circuitry 1710 may include voltage circuitry 120, current circuitry 130, analog control circuitry 136, and/or driving logic circuitry 138, which may be examples of the corresponding circuitry illustrated by and described with reference to FIGS. 1A, 1B, 2A, 2B, 3A, 3B, 4, 5, 6, 7, 8, 9, 10, 11, 12, 13, 14, 15, and 16. For example, in some embodiments, the voltage circuitry 120 may include a voltage sense circuitry and a voltage rectification circuitry coupled to the voltage sense circuitry in which the voltage sense circuitry is configured to receive at least one voltage signal and output a first voltage sense signal representative of a line voltage of a PFC circuit and the voltage rectification circuitry is configured to receive the first voltage sense signal and output a second voltage sense signal comprising a first uni-directional waveform. The current circuitry 130 may include a current rectification circuitry coupled to a current sense circuitry, in which the current sense circuitry is configured to receive a current signal and output a first current sense signal representative of a current associated with an inductor of the PFC circuit and the current rectification circuitry is configured to receive the first current sense signal and output a second current sense signal comprising a second uni-directional waveform. The analog control circuitry may be coupled to the voltage rectification circuitry and the current rectification circuitry and may be configured to receive the second voltage sense signal and the second current sense signal and output a PWM signal. The driving logic circuitry may be coupled to the analog control circuitry and may be configured to receive the PWM signal and generate a plurality of signals for a plurality of switches of the PFC circuit based in part on the PWM signal.

The device 1700 may be implement in hardware, software, or a combination of hardware and software. In various embodiments, the device 1700 may be embodied in an integrated circuit, a microcontroller unit (MCU) (e.g., virtual machine running in an MCU), and/or the like. It should be readily appreciated that the embodiments of the systems, apparatuses, and methods described herein may be configured in various additional and alternative manners in addition to those expressly described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. A controller comprising:

a voltage sense circuitry configured to receive at least one voltage signal and output a first voltage sense signal representative of a line voltage of a power factor correction (PFC) circuit, wherein the first voltage sense signal comprises a first bi-directional waveform;

a voltage rectification circuitry coupled to the voltage sense circuitry, wherein the voltage rectification circuitry is configured to receive the first voltage sense signal and output a second voltage sense signal comprising a first uni-directional waveform;

a current sense circuitry configured to receive a current signal and output a first current sense signal representative of a current associated with an inductor of the PFC circuit, wherein the first current sense signal comprises a second bi-directional waveform;

a current rectification circuitry coupled to the current sense circuitry, wherein the current rectification circuitry is configured to receive the first current sense signal and output a second current sense signal comprising a second uni-directional waveform;

an analog control circuitry coupled to the voltage rectification circuitry and the current rectification circuitry, wherein the analog control circuitry is configured to receive the second voltage sense signal and the second current sense signal and output a pulse-width modulation (PWM) signal; and a driving logic circuitry coupled to the analog control circuitry, wherein the driving logic circuitry is configured to receive the PWM signal and generate a plurality of signals for a plurality of switches of the PFC circuit based at least in part on the PWM signal.

2. The controller of claim 1, wherein the voltage sense circuitry comprises a difference amplifier, and wherein the voltage rectification circuitry comprises a full-wave signal rectifier coupled to the difference amplifier.

3. The controller of claim 1, wherein the current sense circuitry comprises a shunt resistor, and wherein the current rectification circuitry comprises a high-frequency full-wave rectification circuit.

4. The controller of claim 1, wherein the current sense circuitry and the current rectification circuitry are substantially isolated from the plurality of switches.

5. The controller of claim 1, wherein the controller comprises a current sensing device including the current sense circuitry and the current rectification circuitry, and wherein the current rectification circuitry comprises a high-frequency full-wave rectification circuitry of the current sensing device.

6. The controller of claim 1, wherein the analog control circuitry comprises a voltage loop configured to regulate an output voltage associated with the PFC circuit and a current loop configured to regulate the current, and wherein the analog control circuitry is configured to generate the PWM signal based at least in part on the voltage loop and the current loop.

7. The controller of claim 1, wherein the analog control circuitry comprises a PWM stop logic circuitry configured to disable one or more switches of the plurality of switches of the PFC circuit in response to one or more triggers.

8. The controller of claim 7, wherein the one or more triggers comprise at least one of the following: a burst mode, a disable command, over voltage protection, an idle mode, feedback disconnection, over current protection, or zero current detection.

9. The controller of claim 1, wherein each signal of the plurality of signals generated via the driving logic circuitry is associated with a respective switch of the plurality of switches of the PFC circuit.

10. The controller of claim 1, wherein the plurality of signals generated via the driving logic circuitry comprises a fast leg low side signal, a fast leg high side signal, a slow leg low side signal, and a slow leg high side signal.

11. The controller of claim 10, wherein respective values of the slow leg low side signal and the slow leg high side signal are based at least in part on a half cycle associated with the first voltage sense signal, and wherein the fast leg low side signal and the fast leg high side signal are based at least in part on the slow leg low side signal, the slow leg high side signal, and the PWM signal.

12. The controller of claim 1, wherein the controller further comprises a plurality of gate drivers associated with the plurality of switches.

13. The controller of claim 1, wherein the driving logic circuitry is configured to output the plurality of signals to a plurality of gate drivers associated with the plurality of switches, and wherein the plurality of gate drivers is external to the controller.

14. The controller of claim 1, wherein the controller comprises a first portion of circuitry and a second portion of circuitry coupled to the first portion of circuitry, wherein the first portion of circuitry includes at least the analog control circuitry, and wherein the second portion of circuitry includes at least a portion of the driving logic circuitry.

15. The controller of claim 14, wherein the second portion of circuitry further includes a plurality of gate drivers associated with the plurality of switches and the PFC circuit.

16. A system comprising:

a power factor correction (PFC) circuit comprising a plurality of switches; and a controller for the PFC circuit, wherein the controller comprises:

a voltage sense circuitry configured to receive at least one voltage signal and output a first voltage sense signal representative of a line voltage of the PFC circuit, wherein the first voltage sense signal comprises a first bi-directional waveform;

a voltage rectification circuitry coupled to the voltage sense circuitry, wherein the voltage rectification circuitry is configured to receive the first voltage sense signal and output a second voltage sense signal comprising a first uni-directional waveform;

a current sense circuitry configured to receive a current signal and output a first current sense signal representative of a current associated with an inductor of the PFC circuit, wherein the first current sense signal comprises a second bi-directional waveform;

a current rectification circuitry coupled to the current sense circuitry, wherein the current rectification circuitry is configured to receive the first current sense signal and output a second current sense signal comprising a second uni-directional waveform;

an analog control circuitry coupled to the voltage rectification circuitry and the current rectification circuitry, wherein the analog control circuitry is configured to receive the second voltage sense signal and the second current sense signal and output a pulse-width modulation (PWM) signal; and a driving logic circuitry coupled to the analog control circuitry, wherein the driving logic circuitry is configured to receive the PWM signal and generate a plurality of signals for the plurality of switches based at least in part on the PWM signal.

17. The system of claim 16, wherein the plurality of switches comprises a plurality of gallium nitride transistors.

18. The system of claim 16, wherein the PFC circuit is configured in accordance with a bridgeless totem pole topology.

19. A method comprising:

providing a power factor correction (PFC) circuit comprising a plurality of switches;

providing a PFC controller coupled to the PFC circuit, wherein the PFC controller comprises a voltage rectification circuitry coupled to a voltage sense circuitry, a current rectification circuitry coupled to a current sense circuitry, an analog control circuitry coupled to the voltage rectification circuitry and the current rectification circuitry, and a driving logic circuitry coupled to the analog control circuitry, wherein the analog control circuitry is configured to output a pulse-width modulation (PWM) signal based at least in part on a voltage sense signal from the voltage rectification circuitry and a current sense signal from the current rectification circuitry, and wherein the driving logic circuitry is configured to generate a plurality of signals based at least in part on the PWM signal; and operating at least one switch of the plurality of switches to change states between an on state and an off state based at least in part on at least one signal of the plurality of signals.

20. The method of claim 19, wherein the analog control circuitry comprises a voltage loop configured to regulate an output voltage associated with the PFC circuit and a current loop configured to regulate a current associated with the PFC circuit, and wherein the analog control circuitry is configured to generate the PWM signal based at least in part on the voltage loop and the current loop.

* * * * *